United States Patent
Iio et al.

(10) Patent No.: US 10,930,953 B2
(45) Date of Patent: Feb. 23, 2021

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Atsuo Iio, Nagoya (JP); Naoki Tomi, Nisshin (JP); Yusuke Miyamoto, Nisshin (JP); Masafumi Yamagata, Toyoake (JP); Tomotaka Ishikawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 204 days.

(21) Appl. No.: 16/247,764

(22) Filed: Jan. 15, 2019

(65) Prior Publication Data
US 2019/0229356 A1      Jul. 25, 2019

(30) Foreign Application Priority Data

Jan. 24, 2018   (JP) ............................. JP2018-009501

(51) Int. Cl.
| | |
|---|---|
| *H01M 8/04537* | (2016.01) |
| *H01M 8/04111* | (2016.01) |
| *H01M 8/04746* | (2016.01) |
| *H01M 8/0438* | (2016.01) |

(52) U.S. Cl.
CPC .... *H01M 8/04626* (2013.01); *H01M 8/04111* (2013.01); *H01M 8/04395* (2013.01); *H01M 8/04753* (2013.01); *H01M 2250/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0088177 A1* | 4/2012 | Kirklin | ............ | H01M 8/04776 429/444 |
| 2015/0372328 A1 | 12/2015 | Taruya et al. | | |
| 2016/0126566 A1 | 5/2016 | Iio | | |

FOREIGN PATENT DOCUMENTS

| | | |
|---|---|---|
| JP | 2009-076243 A | 4/2009 |
| JP | 2009-123550 A | 6/2009 |
| JP | 2010-146749 A | 7/2010 |
| JP | 2012-094534 A | 5/2012 |
| JP | 2016-009518 A | 1/2016 |
| JP | 2016-091833 A | 5/2016 |
| JP | 2018-181771 A | 11/2018 |

* cited by examiner

*Primary Examiner* — Christopher P Domone
(74) *Attorney, Agent, or Firm* — Dickinson Wright PLLC

(57) ABSTRACT

A control unit of a fuel cell system acquires a service operating point, repeats a process of calculating a distance between the service operating point and a surging region, while transferring an operating point of a turbo compressor from a first operating point to a second operating point outside the surging region, sets opening degrees of a pressure adjusting valve and a bypass valve such that the turbo compressor operates at a required operating point, when the distance exceeds a threshold, and corrects at least one of the opening degrees of the pressure adjusting valve and the bypass valve such that the at least one of the opening degrees becomes larger than an opening degree set such that the turbo compressor operates at the required operating point, when the distance is equal to or shorter than the threshold.

7 Claims, 13 Drawing Sheets

FIG. 9

| | START CONDITION | END CONDITION |
|---|---|---|
| BYPASS VALVE | (1) CONDITION OF AND{(2) OR (3)} IS FULFILLED<br>(1) DISTANCE FROM SURGING REGION APPROACHES 10% OR LESS<br>(2) ACP FLOW RATE FLUCTUATES UPWARD FROM COMMAND BY 10% OR MORE<br>(3) FC AIR PRESSURE FLUCTUATES UPWARD FROM COMMAND BY 10% OR MORE | (4) CONDITION OF AND{(5) OR (6)} IS FULFILLED<br>(4) DISTANCE FROM SURGING REGION HAS EXCEEDED 10%<br>(5) ACP FLOW RATE FLUCTUATES UPWARD FROM COMMAND ALMOST BY 5% OR LESS<br>(6) FC AIR PRESSURE FLUCTUATES UPWARD FROM COMMAND ALMOST BY 5% OR LESS |
| PRESSURE ADJUSTING VALVE | (7) CONDITION OF AND{(8) OR (9)} IS FULFILLED<br>(7) DISTANCE FROM SURGING REGION APPROACHES 10% OR LESS<br>(8) ACP FLOW RATE FLUCTUATES DOWNWARD FROM COMMAND OR UPWARD FROM COMMAND BY 5% OR MORE<br>(9) FC AIR PRESSURE FLUCTUATES UPWARD FROM COMMAND BY 10% OR MORE | (10) CONDITION OF AND{(11) OR (12)} IS FULFILLED<br>(10) DISTANCE FROM SURGING REGION HAS EXCEEDED 10%<br>(11) ACP FLOW RATE FLUCTUATES UPWARD FROM COMMAND BY 10% OR MORE<br>(12) FC AIR PRESSURE FLUCTUATES UPWARD FROM COMMAND ALMOST BY 5% OR LESS |

FUEL CELL SYSTEM AND METHOD OF CONTROLLING FUEL CELL SYSTEM

INCORPORATION BY REFERENCE

The disclosure of Japanese Patent Application No. 2018-009501 filed on Jan. 24, 2018 including the specification, drawings and abstract is incorporated herein by reference in its entirety.

BACKGROUND

1. Technical Field

The disclosure relates to a fuel cell system and a method of controlling the fuel cell system.

2. Description of Related Art

As for a fuel cell system, it is disclosed in, for example, Japanese Patent Application Publication No. 2009-123550 (JP 2009-123550 A) that an operating point that is not included in a surging region is adopted as a target operating point of a turbo compressor when a required operating point of the turbo compressor, which is determined by an air flow rate and an air pressure that are required by a fuel cell, is included in the surging region. "The surging region" means an operating point range where surging occurs in the turbo compressor.

SUMMARY

In transferring the operating point of the turbo compressor, the air pressure on the discharge side of the turbo compressor changes as the flow rate of air discharged from the turbo compressor changes. Therefore, a difference may be created between the target operating point and an operating point at which the turbo compressor is actually operated. In this case, even when the target operating point is set as an operating point that is not included in the surging region, the actual operating point may enter the surging region during transfer of the operating point. Therefore, an art capable of more reliably preventing the actual operating point from entering the surging region has been desired.

(1) A first aspect of the disclosure relates to a fuel cell system. This fuel cell system is equipped with a fuel cell, an air supply flow passage through which air is supplied to the fuel cell, an air discharge flow passage to which the air is discharged from the fuel cell, a bypass flow passage through which the air in the air supply flow passage is discharged without the intermediary of the fuel cell, a turbo compressor that supplies the air to the air supply flow passage, a pressure adjusting valve that is provided in the air discharge flow passage, a bypass valve that is provided in the bypass flow passage, and a control unit configured to control the driving of the turbo compressor, an opening degree of the pressure adjusting valve, and an opening degree of the bypass valve in accordance with a required operating point including an air flow rate and an air pressure that are required for electric power generation of the fuel cell. The turbo compressor is provided upstream of a portion of the air supply flow passage that is connected to the bypass flow passage. The control unit is configured to acquire a service operating point including the air flow rate and the air pressure in the air supply flow passage while transferring an operating point of the turbo compressor from a first operating point to a second operating point. The first operating point and the second operating point are outside a surging region as an operating point range where surging occurs in the turbo compressor. The control unit is configured to repeat a process of calculating a distance between the service operating point and the surging region, set the opening degrees of the pressure adjusting valve and the bypass valve such that the turbo compressor operates at the required operating point, when the distance exceeds a threshold, and correct at least one of the opening degrees of the pressure adjusting valve and the bypass valve such that the at least one of the opening degrees becomes larger than an opening degree set such that the turbo compressor operates at the required operating point, when the distance is equal to or shorter than the threshold. According to the fuel cell system of this aspect, the service operating point of the turbo compressor is distanced from the surging region by correcting the at least one of the opening degrees of the pressure adjusting valve and the bypass valve such that the at least one of the opening degrees becomes larger than the opening degree set such that the turbo compressor operates at the required operating point. Therefore, the service operating point can be restrained from entering the surging region in transferring the operating point of the turbo compressor.

(2) The control unit may be configured to correct the opening degree of the bypass valve when a difference between the air flow rate at the service operating point and the air flow rate set to ensure operation at the required operating point is equal to or higher than a flow rate determined in advance, in a case where the distance is equal to or shorter than the threshold. In this manner, even when the air flow rate at the service operating point fluctuates upward, the opening degree of the bypass valve is corrected, and the air pressure on the discharge side of the turbo compressor is reduced. Therefore, the air pressure on the discharge side is restrained from fluctuating upward as a result of upward fluctuations in the air flow rate at the service operating point, and the service operating point of the turbo compressor can be more reliably restrained from entering the surging region.

(3) The control unit may be configured to reduce an amount of increase in the at least one of the opening degrees of the pressure adjusting valve and the bypass valve as the distance increases, in a case where the distance is equal to or shorter than the threshold. In this manner, each of the opening degrees of the pressure adjusting valve and the bypass valve is restrained from being rapidly changed across the threshold. Therefore, the occurrence of hunting, that is, the repetition of upward and downward fluctuations in the air flow rate and the air pressure at the service operating point with respect to the air flow rate and the air pressure at the required operating point can be suppressed.

(4) The control unit may be configured to make an amount of change in rotational speed of the turbo compressor per unit time smaller than when the at least one of the opening degrees of the pressure adjusting valve and the bypass valve is not corrected, in correcting the at least one of the opening degrees of the pressure adjusting valve and the bypass valve in a case where the distance is equal to or shorter than the threshold. In this manner, the air flow rate and the air pressure that have been set to ensure operation at the required operating point and the air flow rate and the air pressure at the service operating point are restrained from deviating from each other respectively as a result of rapid changes in rotational speed of the turbo compressor, and the service operating point of the turbo compressor can be more reliably restrained from entering the surging region.

(5) The control unit may be configured to make an amount of change in the at least one of the opening degrees of the pressure adjusting valve and the bypass valve per unit time smaller than when the at least one of the opening degrees of the pressure adjusting valve and the bypass valve is not corrected, in correcting the at least one of the opening degrees of the pressure adjusting valve and the bypass valve in a case where the distance is equal to or shorter than the threshold. In this manner, the air flow rate and the air pressure that have been set to ensure operation at the required operating point and the air flow rate and the air pressure at the service operating point are restrained from deviating from each other respectively as a result of rapid changes in the opening degrees of the pressure adjusting valve and the bypass valve, and the service operating point of the turbo compressor can be more reliably restrained from entering the surging region.

(6) A second aspect of the disclosure relates to a method of controlling a fuel cell system that is equipped with a fuel cell. The method includes (i) acquiring a service operating point including an air flow rate and an air pressure in an air supply flow passage in which a turbo compressor is provided, and repeating a process of calculating a distance between the service operating point and a surging region as an operating point range where surging occurs in the turbo compressor, while transferring an operating point of the turbo compressor, which supplies air to the fuel cell, from a first operating point to a second operating point, the first operating point and the second operating point being outside the surging region; (ii) setting an opening degree of a pressure adjusting valve that is provided in an air discharge flow passage through which air is discharged from the fuel cell, and an opening degree of a bypass valve that is provided in a bypass flow passage through which the air in the air supply flow passage is discharged without intermediary of the fuel cell, such that the turbo compressor operates at a required operating point including the air flow rate and the air pressure that are required for electric power generation of the fuel cell, when the distance exceeds a threshold; and (iii) correcting at least one of the opening degrees of the pressure adjusting valve and the bypass valve such that the at least one of the opening degrees becomes larger than an opening degree set such that the turbo compressor operates at the required operating point, when the distance is equal to or shorter than the threshold.

The disclosure can also be realized in various forms other than the fuel cell system. For example, the disclosure can be realized in the forms of a method of controlling the fuel cell system, a fuel-cell-powered vehicle, a method of suppressing the surging of a turbo compressor, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is an illustrative view showing exemplary conditions for starting and ending corrections of valve opening degrees;

DETAILED DESCRIPTION OF EMBODIMENTS

A. First Embodiment

Figure 1:
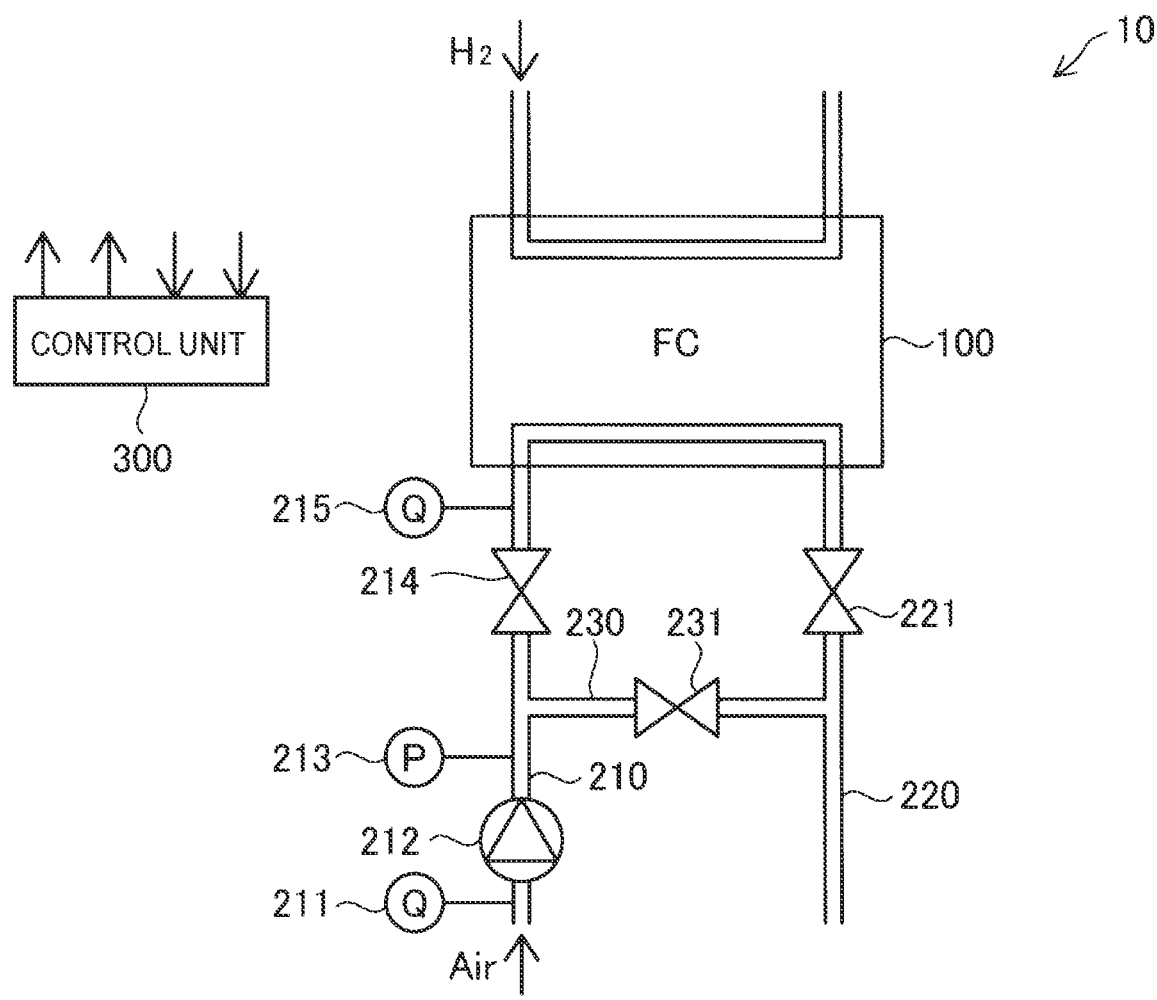
FIG. 1 is an illustrative view showing the overall configuration of a fuel cell system according to the first embodiment.

FIG. 1 is an illustrative view showing the overall configuration of a fuel cell system 10 according to the first embodiment. The fuel cell system 10 according to the present embodiment is mounted in, for example, a fuel-cell-powered vehicle, and is used as an electric power generation device for driving a motor for driving the fuel-cell-powered vehicle. The fuel cell system 10 may be used as a stationary electric power generation device. The fuel cell system 10 is equipped with a fuel cell 100, an air supply flow passage 210, an air discharge flow passage 220, a bypass flow passage 230, a turbo compressor 212, an inlet valve 214, a pressure adjusting valve 221, a bypass valve 231, a first flow rate sensor 211, a second flow rate sensor 215, a pressure sensor 213, and a control unit 300.

The fuel cell 100 of the present embodiment is a solid polymer fuel cell. The fuel cell 100 has a stack structure having a plurality of cells stacked on one another. Each of the cells is equipped with a membrane electrode conjugant having electrode catalyst layers on both surfaces of an electrolytic membrane, and a pair of separators that sandwich the membrane electrode conjugant. Hydrogen gas as fuel gas is supplied to an anode side of the membrane electrode conjugant, and air as oxidation gas is supplied to a cathode side of the membrane electrode conjugant. Thus, each of the cells generates an electromotive force through an electrochemical reaction. The respective cells are connected in series to one another. Incidentally, a coolant flow passage through which a cooling medium for cooling the fuel cell 100 circulates may be connected to the fuel cell 100.

The air supply flow passage 210 is a flow passage for supplying air to a cathode side of the fuel cell 100. The air supply flow passage 210 is provided, sequentially from an upstream side thereof, with the first flow rate sensor 211, the turbo compressor 212, the pressure sensor 213, the inlet valve 214, and the second flow rate sensor 215.

The turbo compressor 212 is arranged on the upstream side in the air supply flow passage 210. The turbo compressor 212 of the present embodiment is a centrifugal compressor. The turbo compressor 212 is driven by a motor. The turbo compressor 212 sucks the air in the atmosphere from a suction side thereof, pressurizes the air through rotation of an impeller provided in the turbo compressor 212, and supplies the pressurized air to the air supply flow passage 210 from a discharge side thereof. Incidentally, an axial flow compressor may be employed as the turbo compressor 212.

The inlet valve 214 is provided between the turbo compressor 212 and the fuel cell 100 in the air supply flow passage 210. The flow passage resistance in the air supply flow passage 210 is changed by changing the opening degree of the inlet valve 214. In the present embodiment, a butterfly valve is employed as the inlet valve 214, and is configured as an electrically operated valve that is driven by a DC motor. The opening degree of the inlet valve 214 is controlled through the control of the driving of the DC motor by the control unit 300. Incidentally, the inlet valve 214 is not an indispensable component.

The first flow rate sensor 211 is provided upstream of the turbo compressor 212 in the air supply flow passage 210. The first flow rate sensor 211 is a sensor for detecting an air flow rate in the air supply flow passage 210. Information on the air flow rate acquired by the first flow rate sensor 211 is transmitted to the control unit 300. The air flow rate acquired by the first flow rate sensor 211 is equivalent to a flow rate of air sucked into the turbo compressor 212.

The second flow rate sensor 215 is provided between the inlet valve 214 and the fuel cell 100 in the air supply flow passage 210. The second flow rate sensor 215 is a sensor for detecting an air flow rate in the air supply flow passage 210. Information on the air flow rate acquired by the second flow rate sensor 215 is transmitted to the control unit 300. The air flow rate acquired by the second flow rate sensor 215 is equivalent to a flow rate of air supplied to the fuel cell 100.

The pressure sensor 213 is provided between the turbo compressor 212 and the inlet valve 214 in the air supply flow passage 210. The pressure sensor 213 is a sensor for detecting an air pressure in the air supply flow passage 210. Information on the air pressure acquired by the pressure sensor 213 is transmitted to the control unit 300. The air pressure acquired by the pressure sensor 213 is equivalent to a pressure of air discharged from the turbo compressor 212.

The air discharge flow passage 220 is a flow passage for discharging air (cathode off-gas) from the cathode side of the fuel cell 100. The air discharge flow passage 220 is provided with the pressure adjusting valve 221.

The pressure adjusting valve 221 is a valve for adjusting the opening degree of the air discharge flow passage 220. In the present embodiment, a butterfly valve is employed as the pressure adjusting valve 221, and is configured as an electrically operated valve that is driven by a DC motor. The opening degree of the pressure adjusting valve 221 is controlled through the control of the driving of the DC motor by the control unit 300.

The bypass flow passage 230 is a flow passage for discharging the air in the air supply flow passage 210 without the intermediary of the fuel cell 100. The bypass flow passage 230 of the present embodiment establishes communication between the air supply flow passage 210 between the turbo compressor 212 and the inlet valve 214, and the air discharge flow passage 220 downstream of the pressure adjusting valve 221.

The bypass valve 231 is provided in the bypass flow passage 230. The bypass valve 231 is a valve for adjusting the opening degree of the bypass flow passage 230. In the present embodiment, a butterfly valve is employed as the bypass valve 231, and is configured as an electrically operated valve that is driven by a DC motor. The opening degree of the bypass valve 231 is controlled through the control of the driving of the DC motor by the control unit 300.

The control unit 300 is configured as a computer that is equipped with a CPU, a memory, and an interface circuit to which respective components are connected. The CPU controls the driving of the turbo compressor 212, the opening degree of the pressure adjusting valve 221, and the opening degree of the bypass valve 231, in accordance with a required operating point including an air flow rate and an air pressure that are required for electric power generation of the fuel cell 100, by executing a control program stored in the memory.

Figure 2:
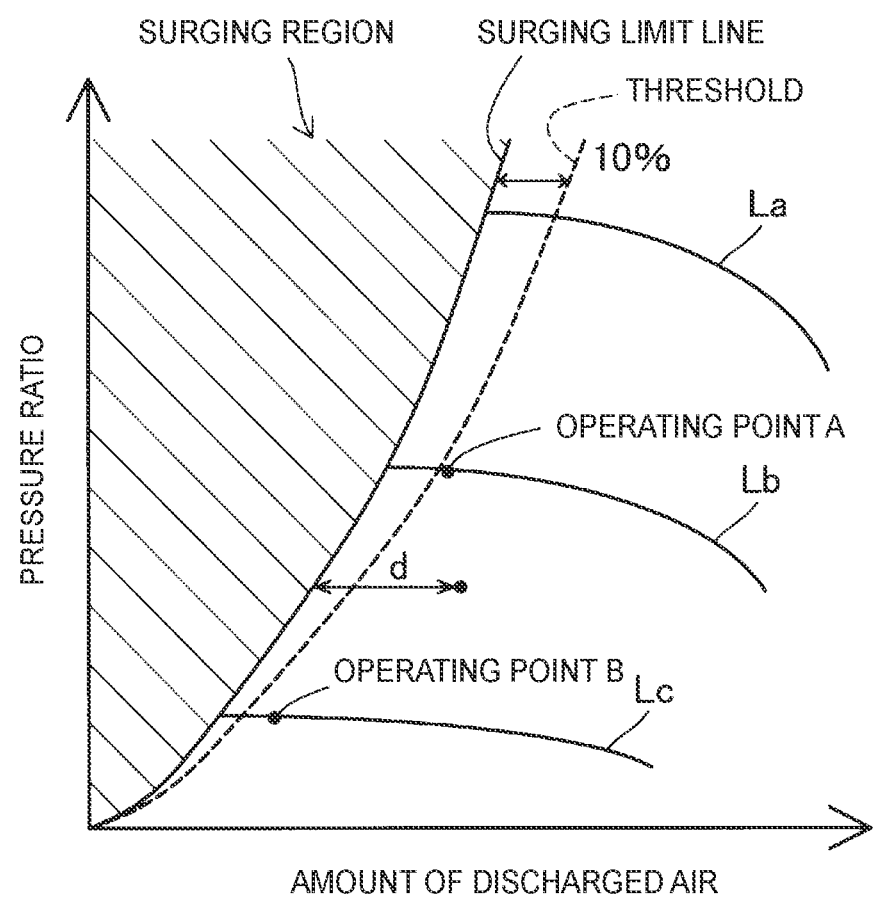
FIG. 2 is an illustrative view showing performance characteristics of a turbo compressor.

FIG. 2 is an illustrative view showing performance characteristics of the turbo compressor 212. The axis of abscissa represents a flow rate of air discharged from the turbo compressor. The axis of ordinate represents a pressure ratio. "The flow rate of discharged air" means a flow rate of air discharged from the turbo compressor 212 per unit time. "The pressure ratio" means a ratio of an air pressure (a discharged air pressure) on the discharge side of the turbo compressor 212 to an air pressure (a sucked air pressure) on the suction side of the turbo compressor 212. Incidentally, when the fuel cell system 10 is operated under an atmospheric pressure, the sucked air pressure is equal to the atmospheric pressure, so the discharged air pressure may be used instead of the pressure ratio. FIG. 2 shows three pressure curves La, Lb, and Lc. The turbo compressor 212 is driven at the same rotational speed on the same pressure curve. The rotational speed of the turbo compressor 212 rises as the location of the pressure curve in FIG. 2 moves upward. Each of the pressure curves is expressed as a line where the rotational speed of the turbo compressor 212 remains the same, and hence is also referred to as "an iso rotational speed line".

When the flow rate of air discharged from the turbo compressor 212 is lowered, surging that makes it impossible to force-feed air occurs due to a turning stall or the like. In the present specification, an operating point range where surging occurs in the turbo compressor 212 is referred to as "a surging region", and an operating point range where surging does not occur is referred to as "a normal region". A borderline between the surging region and the normal region is referred to as "a surging limit line". The surging limit line is obtained by reducing the discharged air flow rate toward a low flow rate side along each of the plurality of the pressure curves, finding an operating point where surging occurs, and linking the operating points at which surging occurs, which have been found as to the plurality of the pressure curves respectively, with one another. Incidentally, "the operating point" is a point representing a service state of the turbo compressor 212, which is determined by the discharged air flow rate, pressure ratio, and rotational speed of the turbo compressor 212.

In the present specification, an operating point of the turbo compressor 212 including an air flow rate and an air pressure that are required for electric power generation of the fuel cell 100 is referred to as "a required operating point". The required operating point is changed in accordance with an air flow rate (a required air flow rate) that is required for electric power generation of the fuel cell 100, and an air pressure (a required air pressure) that is required for electric power generation of the fuel cell 100. FIG. 2 shows an operating point A and an operating point B outside the surging region of the turbo compressor 212. For example, in the case where the fuel cell system 10 is mounted in a fuel-cell-powered vehicle, if a driver continues to reduce a depressing force applied to an accelerator when the turbo compressor 212 is operated at the operating point A corresponding to the required operating point, the generated electric power required of the fuel cell 100 falls, and the required operating point is gradually changed toward the operating point B, which is lower in flow rate and smaller in pressure ratio than the operating point A. The control unit 300 repeatedly sets commands values of the air flow rate and the air pressure at each of control timings, while transferring the operating point of the turbo compressor 212 from the operating point A toward the operating point B as the required operating point is changed. In the present embodiment, the interval between the respective control timings is in the order of milliseconds. Besides, in the present specification, an operating point including the air flow rate and the air pressure in the air supply flow passage 210 is referred to as "a service operating point". The service operating point is equivalent to an operating point of the turbo compressor 212 that is actually operated in accordance with the required operating point.

Figure 3:
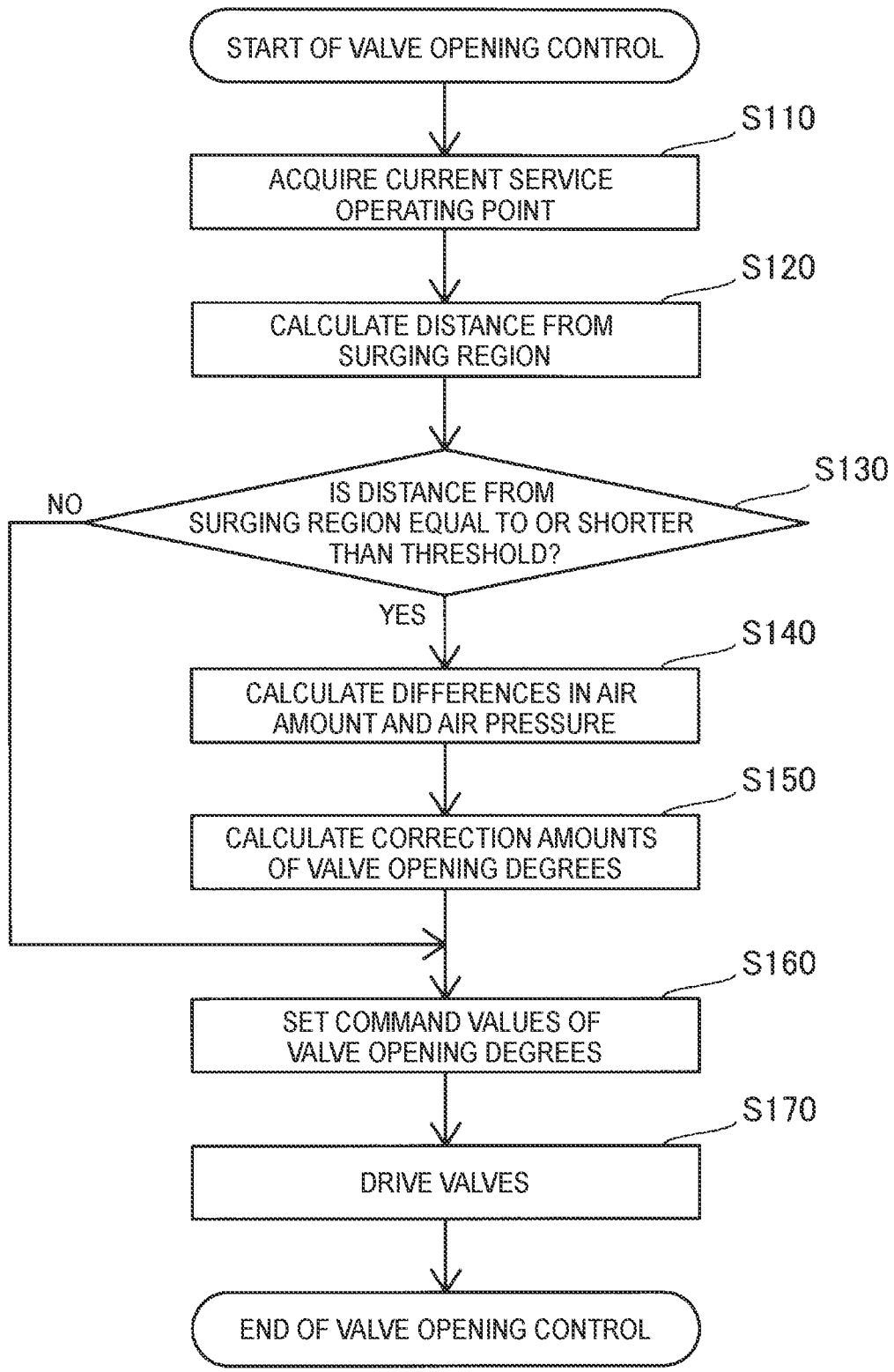
FIG. 3 is a flowchart showing processing contents of valve opening degree control in the first embodiment.

FIG. 3 is a flowchart showing processing contents of opening degree control of the pressure adjusting valve 221 and the bypass valve 231 in the first embodiment. This process is repeatedly performed by the control unit 300 while transferring the operating point of the turbo compressor 212 from a first operating point to a second operating point. The first operating point and the second operating point are outside the surging region.

First of all, the control unit 300 acquires a service operating point at a current control timing through the use of an air flow rate acquired by the first flow rate sensor 211 and an air pressure acquired by the pressure sensor 213 (step S110), and calculates a distance between the service operating point and the surging region (step S120). As shown in FIG. 2, in the present embodiment, a difference d between an air flow rate at the service operating point and an air flow rate at an operating point on the surging limit line with the same pressure ratio as at the service operating point is used as the distance between the service operating point and the surging region.

Subsequently, the control unit 300 determines whether or not the distance from the surging region is equal to or shorter than a threshold (step S130). In the present embodiment, a distance corresponding to 10% of the air flow rate on the surging limit line is used as the threshold. This threshold is preferably set in consideration of the accuracies of the first flow rate sensor 211, the second flow rate sensor 215, and the pressure sensor 213, the responsive characteristics of the pressure adjusting valve 221 and the bypass valve 231, and the like. In FIG. 2, this threshold is indicated by a broken line. If the distance from the surging region exceeds the threshold (NO in step S130), the control unit 300 sets a command value of the opening degree of the pressure adjusting valve 221 and a command value of the opening degree of the bypass valve 231, which correspond to the command value of the air flow rate and the command value of the air pressure at the current control timing, such that the turbo compressor 212 operates at the required operating point (step S160), and drives the pressure adjusting valve 221 and the bypass valve 231 based on the set command values of the opening degrees (S170). After step S170, the control unit 300 performs this process at a subsequent control timing again from step S110. The control unit 300 repeats this process while transferring the operating point of the turbo compressor 212 from the first operating point to the second operating point.

On the other hand, if the distance from the surging region is equal to or shorter than the threshold (YES in step S130), the control unit 300 corrects at least one of the opening degrees of the pressure adjusting valve 221 and the bypass valve 231 such that the at least one of the opening degrees becomes larger than an opening degree set such that the turbo compressor 212 operates at the required operating point. In concrete terms, the control unit 300 first calculates a difference between an actually measured value of the air flow rate acquired by the second flow rate sensor 215 at the current control timing and the command value of the air flow rate at the current control timing, and calculates a difference between an actually measured value of the air pressure acquired by the pressure sensor 213 at the current control timing and the command value of the air pressure at the current control timing (step S140). Subsequently, the control unit 300 calculates a correction amount of the opening degree of the pressure adjusting valve 221 and a correction amount of the opening degree of the bypass valve 231, through the use of the calculated difference between the actually measured value of the air flow rate and the command value thereof, and the calculated difference between the actually measured value of the air pressure and the command value thereof (step S150).

Figure 4:
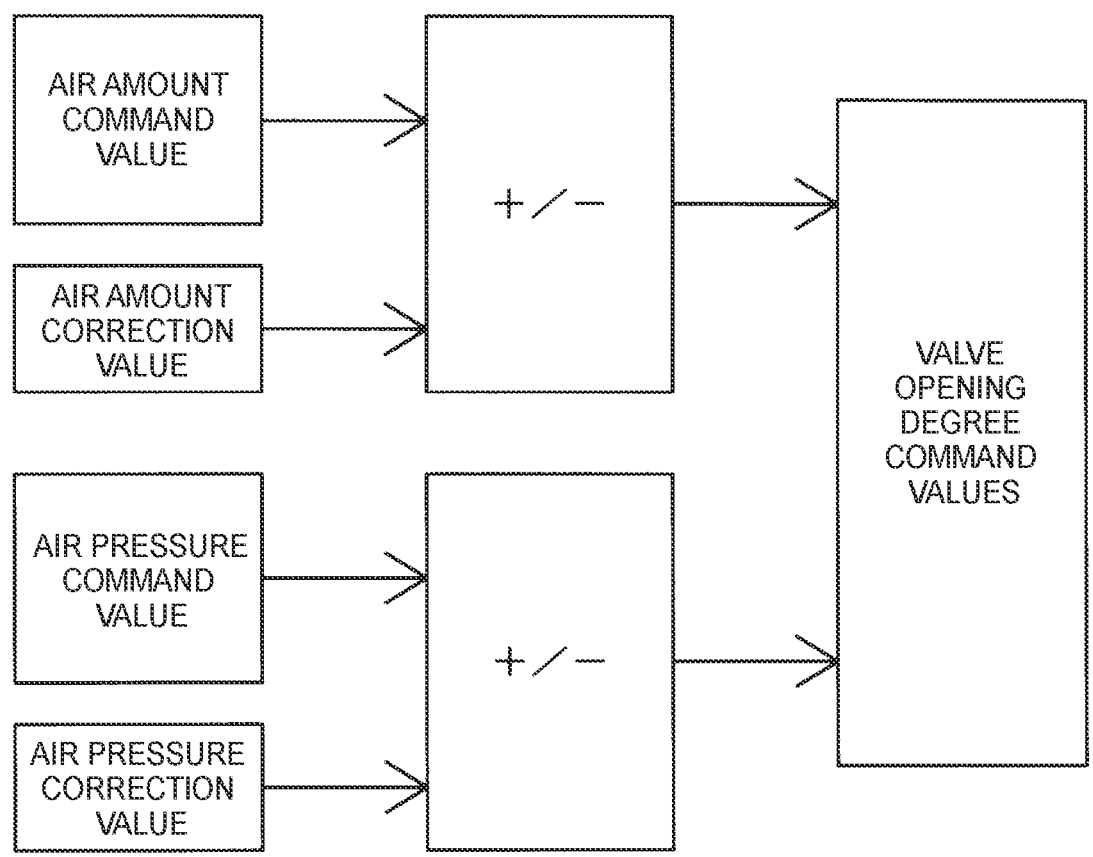
FIG. 4 is an image view of a method of calculating correction amounts of valve opening degrees in the first embodiment.

FIG. 4 is an image view showing a method of calculating the correction amount of the opening degree of the pressure adjusting valve 221 and the correction amount of the opening degree of the bypass valve 231 in the present embodiment. The method according to which the control unit 300 calculates the correction amount of the opening degree of the pressure adjusting valve 221 and the correction amount of the opening degree of the bypass valve 231 in step S150 shown in FIG. 3 will be described through the use of FIG. 4. The control unit 300 calculates a correction amount of the air flow rate such that the difference between the actually measured value of the air flow rate and the command value thereof, which has been calculated in step S140 of FIG. 3, becomes small, and adds the calculated correction amount to the command value of the air flow rate. Besides, the control unit 300 calculates a correction amount of the air pressure such that the difference between the actually measured value of the air pressure and the command value thereof, which has been calculated in step S140 of FIG. 3, becomes small, and adds the calculated correction amount to the command value of the air pressure. Then, the control unit 300 calculates the correction amount of the opening degree of the pressure adjusting valve 221 and the correction amount of the opening degree of the bypass valve 231, in accordance with the command value of the air flow rate to which the correction amount has been added and the command value of the air pressure to which the correction amount has been added.

Returning to FIG. 3, after step S150, the control unit 300 sets a command value of the opening degree of the pressure adjusting valve 221 that takes the correction amount of the opening degree of the pressure adjusting valve 221 into account, and sets a command value of the opening degree of the bypass valve 231 that takes the correction amount of the opening degree of the bypass valve 231 into account (step S160), and drives the pressure adjusting valve 221 and the bypass valve 231 based on the set command values (step S170). After step S170, the control unit 300 performs this process at a subsequent control timing again from step S110. The control unit 300 repeats this process while transferring the operating point of the turbo compressor 212 from the first operating point to the second operating point.

Figure 5:
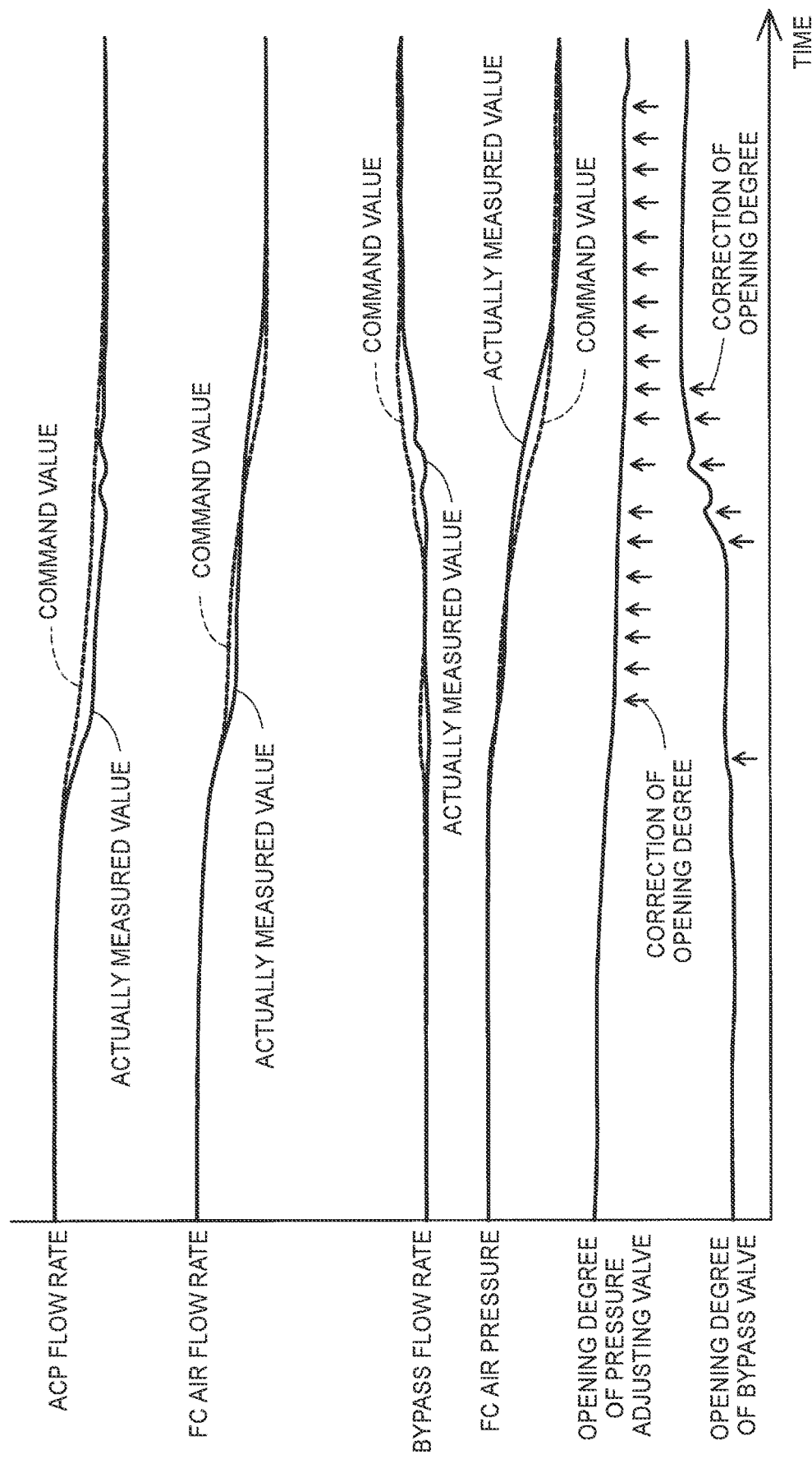
FIG. 5 is a time chart showing air flow rates, an air pressure, and valve opening degrees in the first embodiment.
Figure 6:
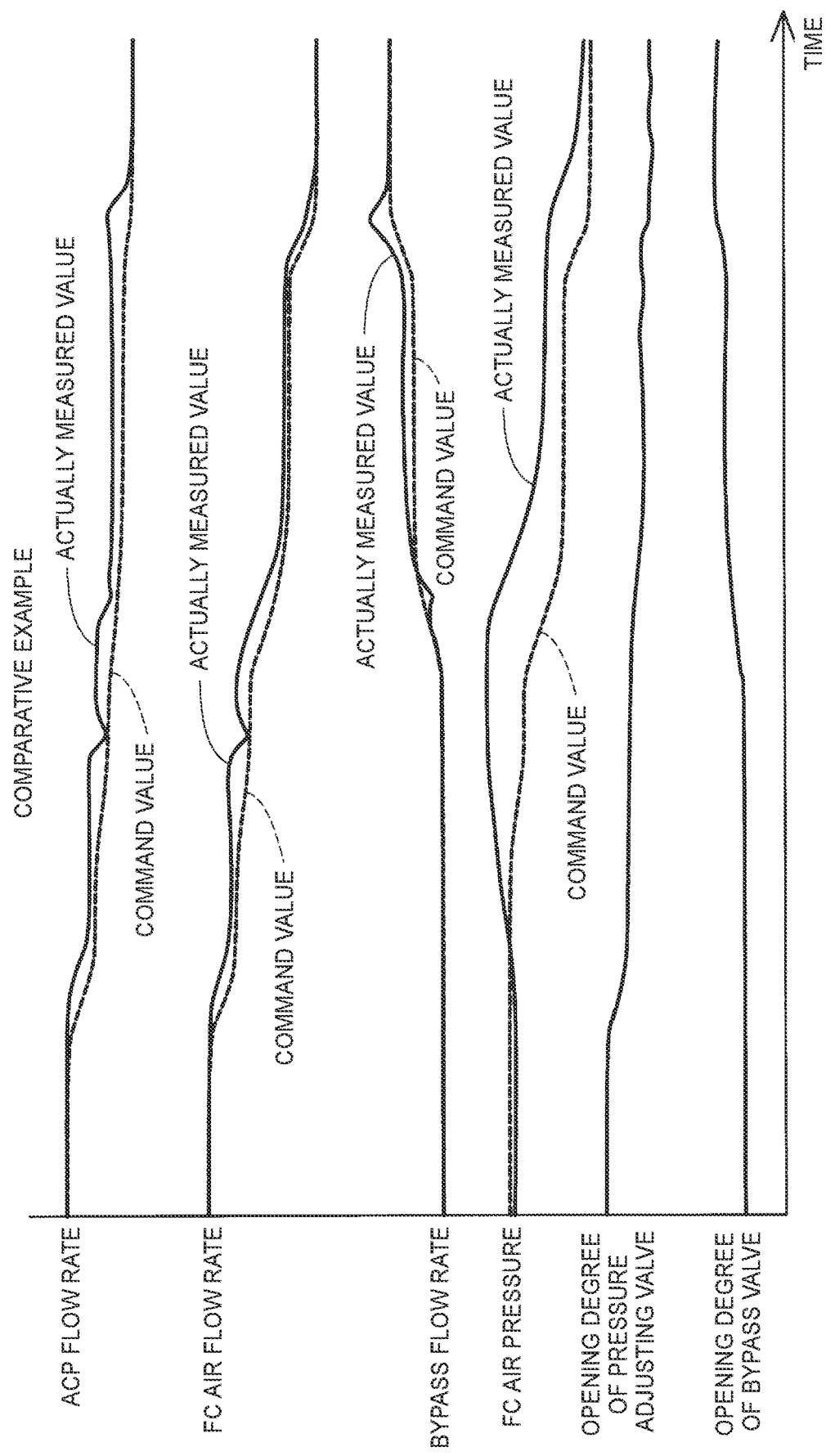
FIG. 6 is a time chart showing air flow rates, an air pressure, and valve opening degrees in a comparative example.

FIG. 5 is a time chart showing an exemplary relationship among the air flow rates, the air pressure, and the opening degrees of the respective valves in the present embodiment. FIG. 6 is a time chart showing an exemplary relationship among the air flow rates, the air pressure, and the opening degrees of the respective valves in a comparative example. The axis of abscissa in each of FIGS. 5 and 6 represents the time during the transfer of the operating point from the first operating point to the second operating point. The axis of ordinate in each of FIGS. 5 and 6 represents the magnitudes of the air flow rates, the air pressure, and the opening degrees of the respective valves, and the magnitudes increase upward along the axis of ordinate and decrease downward along the axis of ordinate, respectively. The command values of the air flow rates and the air pressure are indicated by broken lines, and the actually measured values of the air flow rates and the air pressure are indicated by solid lines. The opening degrees of the respective valves are indicated by solid lines. In the present embodiment (FIG. 5), the opening degrees of the respective valves are corrected at control timings indicated by arrows. In the comparative example (FIG. 6), the opening degree of the pressure adjusting valve 221 and the opening degree of the bypass valve 231 are not corrected.

As shown in FIG. 5, in the present embodiment, the pressure adjusting valve 221 is driven such that the opening degree thereof gradually decreases. However, a correction for increasing the opening degree of the pressure adjusting valve 221 is carried out so as to prevent the opening degree thereof from becoming too small. Therefore, the speed at which the opening degree of the pressure adjusting valve 221 decreases is lower than in the case where the correction is not carried out (FIG. 6). Besides, as shown in FIG. 5, in the present embodiment, the bypass valve 231 is driven such that the opening degree thereof gradually increases. However, a correction for further increasing the opening degree of the bypass valve 231 is carried out so as to ensure that the opening degree thereof is sufficient. Therefore, the opening degree of the bypass valve 231 more quickly increases than in the case where the correction is not carried out (FIG. 6). Due to these corrections, the difference between the actually measured value of each of the air flow rate acquired by the first flow rate sensor 211 (an ACP flow rate), the air flow rate acquired by the second flow rate sensor 215 (an FC air flow rate), and the air pressure acquired by the pressure sensor 213 (an FC air pressure) and the command value thereof is smaller in the case where the corrections are carried out (FIG. 5) than in the case where the corrections are not carried out (FIG. 6).

Figure 7:
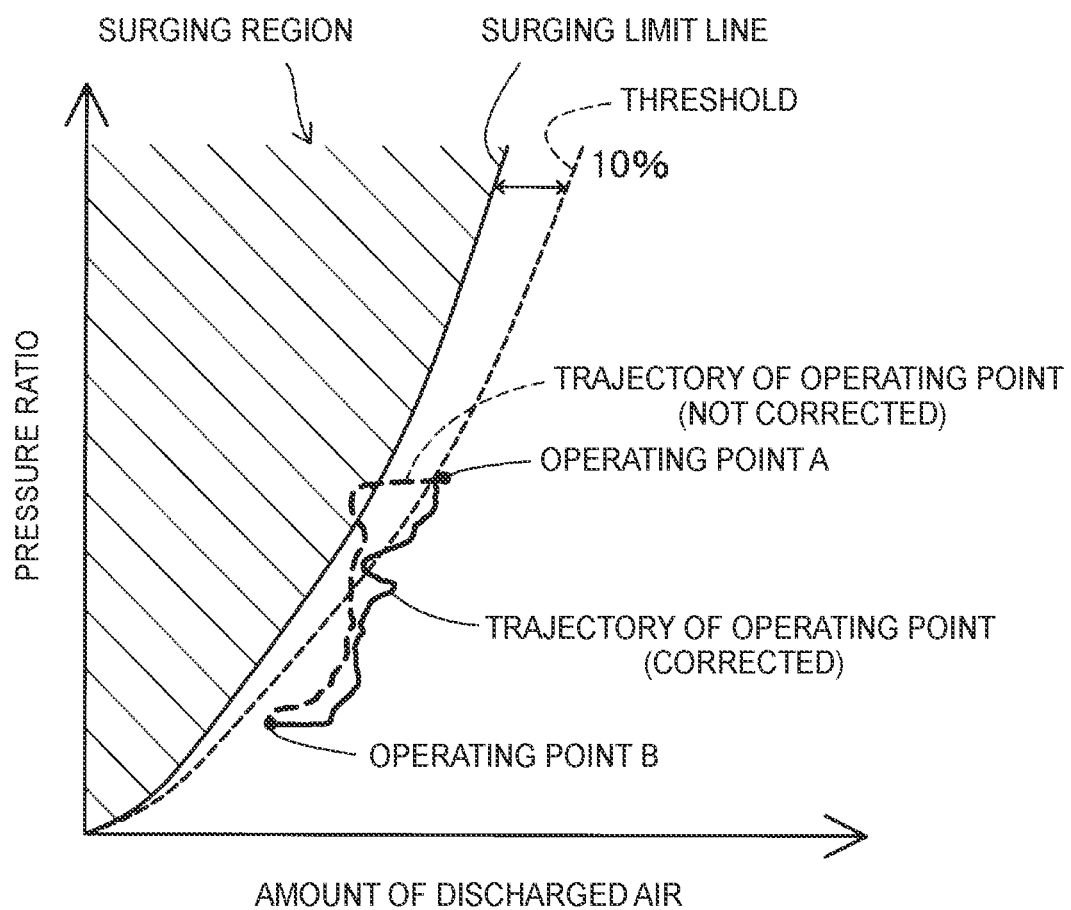
FIG. 7 is an illustrative view showing a trajectory of a service operating point of the turbo compressor.

FIG. 7 is a view showing changes in the ACP flow rate and the FC air pressure as shown in FIGS. 5 and 6 on a characteristic curve diagram of the turbo compressor 212. In FIG. 7, the operating points A and B are the first operating point and the second operating point respectively. FIG. 7 shows a trajectory of the service operating point at the time when the operating point of the turbo compressor 212 is transferred from the first operating point (the operating point A) to the second operating point (the operating point B). The trajectory of the service operating point in the case where the opening degree of the pressure adjusting valve 221 and the opening degree of the bypass valve 231 are corrected is indicated by a solid line, and the trajectory of the service operating point in the case where the opening degree of the pressure adjusting valve 221 and the opening degree of the bypass valve 231 are not corrected is indicated by a broken line. In the case where the opening degree of the pressure adjusting valve 221 and the opening degree of the bypass valve 231 are not corrected, the service operating point is in the surging region. In contrast, in the case where the opening degree of the pressure adjusting valve 221 and the opening degree of the bypass valve 231 are corrected, when the distance between the service operating point and the surging region approaches a distance equal to or shorter than the threshold, the opening degree of the pressure adjusting valve 221 and the opening degree of the bypass valve 231 are corrected, and the service operating point is far from the surging region.

With the fuel cell system 10 according to the present embodiment described above, when the distance between the service operating point of the turbo compressor 212 and the surging region approaches a distance equal to or shorter than the threshold, the control unit 300 corrects the opening degree of the pressure adjusting valve 221 and the opening degree of the bypass valve 231 such that the opening degrees thereof become larger than an opening degree set such that the turbo compressor 212 operates at the required operating point. Thus, the flow rate of air discharged from the turbo compressor 212 increases, and the pressure of air discharged from the turbo compressor 212 falls. Therefore, the service operating point of the turbo compressor 212 can be distanced from the surging region, and the service operating point can be restrained from entering the surging region.

Besides, in the present embodiment, the control unit 300 calculates the distance between the service operating point and the surging region, and corrects the opening degree of the pressure adjusting valve 221 and the opening degree of the bypass valve 231 only when the distance approaches a distance equal to or longer than the threshold. Therefore, the opening degree of the pressure adjusting valve 221 and the opening degree of the bypass valve 231 can be corrected only in the case where the service operating point may enter the surging region.

Besides, in the present embodiment, the control unit 300 uses the actually measured value of the flow rate of air supplied to the fuel cell 100, which has been acquired by the second flow rate sensor 215, to calculate the correction amounts of the opening degree of the pressure adjusting valve 221 and the opening degree of the bypass valve 231. Therefore, the air flow rate required by the fuel cell 100 can be more reliably ensured than in the case where the correction amounts of the opening degree of the pressure adjusting valve 221 and the opening degree of the bypass valve 231 are calculated through the use of the actually measured value of the flow rate of air discharged from the turbo compressor 212, which has been acquired by the first flow rate sensor 211.

B. Second Embodiment

Figure 8:
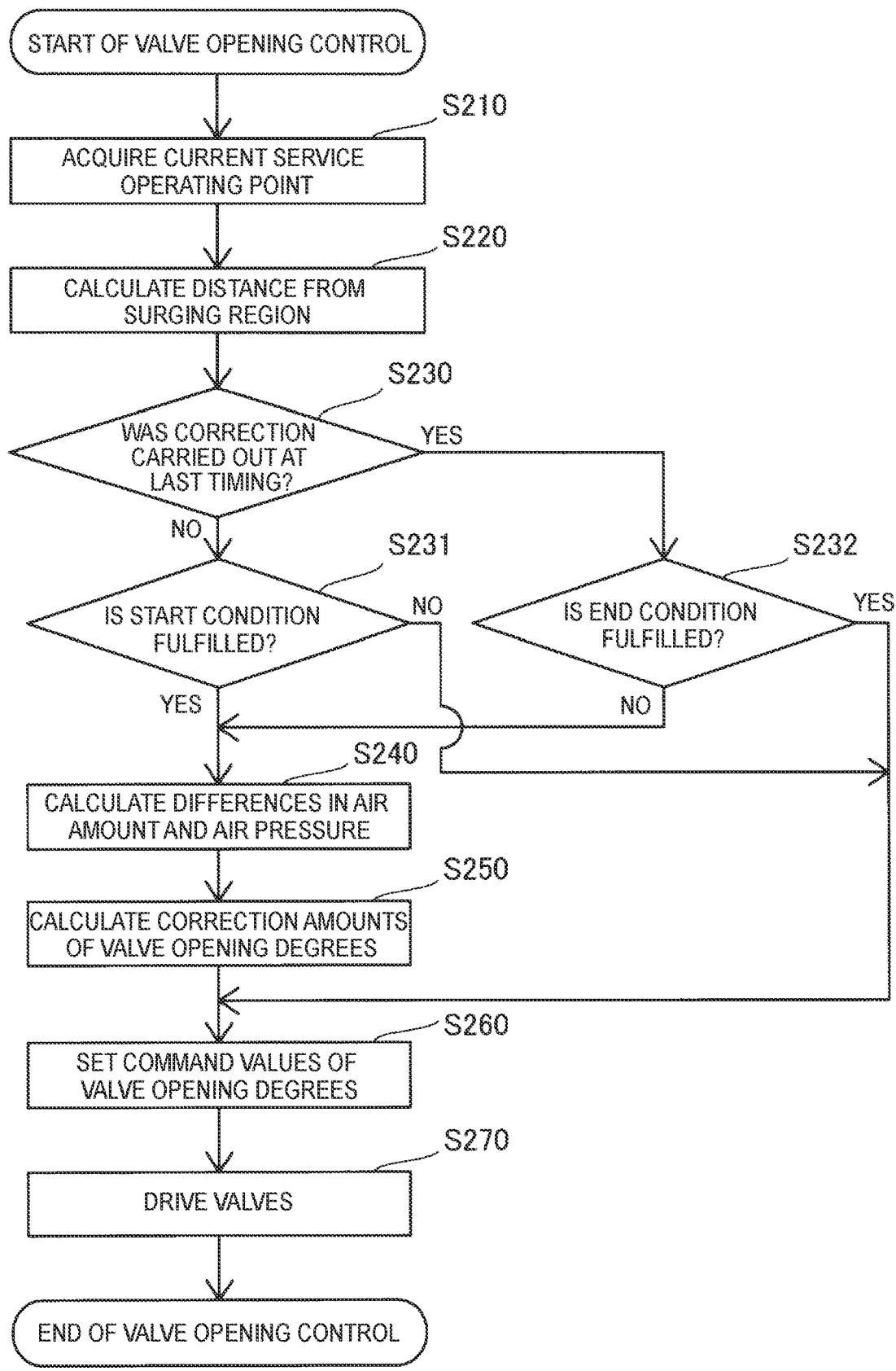
FIG. 8 is a flowchart showing processing contents of valve opening degree control in the second embodiment.

FIG. 8 is a flowchart showing processing contents of opening degree control of the pressure adjusting valve 221 and the bypass valve 231 in the second embodiment. In the second embodiment, the configuration of the fuel cell system 10 is the same as in the first embodiment (FIG. 1). The second embodiment is different from the first embodiment (FIG. 3) in that the control unit 300 corrects the opening degree of the pressure adjusting valve 221 and the opening degree of the bypass valve 231 in accordance with a predetermined start condition and a predetermined end condition when the distance between the service operating point and the surging region is equal to or shorter than the threshold.

First of all, the control unit 300 acquires a service operating point at a current control timing (step S210), and calculates a distance between the service operating point and the surging region (step S220), as is the case with the first embodiment. Subsequently, the control unit 300 determines whether or not a correction of at least one of the opening degrees was carried out at a last control timing (step S230). If the correction of at least one of the opening degrees was not carried out at the last control timing (NO in step S230), the control unit 300 determines whether or not the predetermined start condition shown in FIG. 9, which will be described later, is fulfilled (step S231). If the start condition is fulfilled (YES in step S231), the control unit 300 calculates a difference between an actually measured value of an air flow rate and a command value thereof at the current control timing, and calculates a difference between an actually measured value of an air pressure and a command value thereof at the current control timing (step S240), and calculates a correction amount of the opening degree of the pressure adjusting valve 221 and a correction amount of the opening degree of the bypass valve 231 through the use of the calculated difference between the actually measured value of the air flow rate and the command value thereof, and the calculated difference between the actually measured value of the air pressure and the command value thereof (step S250), as is the case with the first embodiment. On the other hand, if the start condition is not fulfilled (NO in step S231), the control unit 300 advances the process to step S260.

If the correction of at least one of the opening degrees was carried out at the last control timing (YES in step S230), the control unit 300 determines whether or not the predetermined end condition shown in FIG. 9, which will be described later, is fulfilled (step S232). If the end condition is fulfilled (YES in step S232), the control unit 300 advances the process to step S260. On the other hand, if the end condition is not fulfilled (NO in step S232), the control unit 300 calculates the difference between the actually measured value of the air flow rate and the command value thereof at the current control timing, and calculates the difference between the actually measured value of the air pressure and the command value thereof at the current control timing (step S240), and calculates the correction amount of the opening degree of the pressure adjusting valve 221 and the correction amount of the opening degree of the bypass valve 231 through the use of the calculated difference between the actually measured value of the air flow rate and the command value thereof, and the calculated difference between the actually measured value of the air pressure and the command value thereof (step S250), as is the case with the first embodiment.

After step S250, the control unit 300 sets a command value of the opening degree of the pressure adjusting valve 221, and sets a command value of the opening degree of the bypass valve 231 (step S260), and drives the pressure adjusting valve 221 and the bypass valve 231 based on the set command values (step S270), as is the case with the first embodiment. After step S270, the control unit 300 performs this process at a subsequent control timing again from step S210. The control unit 300 repeats this process while transferring the operating point of the turbo compressor 212 from the first operating point to the second operating point.

FIG. 9 is an illustrative view showing examples of the start and end conditions for starting and ending the corrections of the opening degree of the pressure adjusting valve 221 and the opening degree of the bypass valve 231 in the present embodiment. This start condition and this end condition are set such that the operating point of the turbo compressor 212 does not enter the surging region, and that the air flow rate and the air pressure that are required for electric power generation of the fuel cell 100 do not drop below their lower limits. The condition for starting the correction of the opening degree of the bypass valve 231 will be described. When the distance between the service operating point of the turbo compressor 212 and the surging region is equal to or shorter than the threshold (10%), and the actually measured value of the air flow rate acquired by the second flow rate sensor 215 at the current control timing fluctuates upward from the command value thereof by 10% or more, or the actually measured value of the air pressure acquired by the pressure sensor 213 at the current control timing fluctuates upward from the command value thereof by 10% or more, the correction of the opening degree of the bypass valve 231 is started. The condition for ending the correction of the opening degree of the bypass valve 231 will be described. When (i) the distance between the service operating point of the turbo compressor 212 and the surging region exceeds the threshold (10%), and (ii)(a) the actually measured value of the air flow rate acquired by the second flow rate sensor 215 at the current control timing fluctuates upward from the command value thereof by 5% or less, or (b) the actually measured value of the air pressure acquired by the pressure sensor 213 at the current control timing fluctuates upward from the command value thereof by 5% or less, the correction of the opening degree of the bypass valve 231 is ended. That is, in carrying out the correction, the control unit 300 corrects the opening degree of the bypass valve 231 when the difference between the actually measured value of the air flow rate at the service operating point and the command value of the air flow rate set to ensure operation at the required operating point is equal to or higher than a flow rate determined in advance.

The condition for starting the correction of the opening degree of the pressure adjusting valve 221 will be described. When (i) the distance between the service operating point of the turbo compressor 212 and the surging region is equal to or shorter than the threshold (10%), and (ii) (a) the actually measured value of the air flow rate acquired by the second flow rate sensor 215 at the current control timing fluctuates downward from the command value thereof or fluctuates upward from the command value thereof by 5% or less, or (b) the actually measured value of the air pressure acquired by the pressure sensor 213 at the current control timing fluctuates upward from the command value thereof by 10% or more, the correction of the opening degree of the pressure adjusting valve 221 is started. The condition for ending the correction of the opening degree of the pressure adjusting valve 221 will be described. When (i) the distance between the service operating point of the turbo compressor 212 and the surging region exceeds the threshold (10%), and (ii) (a) the actually measured value of the air flow rate acquired by the second flow rate sensor 215 at the current control timing fluctuates upward from the command value thereof by 10% or more, or (b) the actually measured value of the air pressure acquired by the pressure sensor 213 at the current control timing fluctuates upward from the command value thereof by 5% or less, the correction of the opening degree of the pressure adjusting valve 221 is ended.

In the fuel cell system 10 according to the present embodiment described above, even when the air flow rate at the service operating point fluctuates upward from the command value thereof, the opening degree of the bypass valve 231 is corrected, and the pressure of air discharged from the turbo compressor 212 is reduced. Therefore, the discharged air pressure is restrained from fluctuating upward as a result of upward fluctuations in the air flow rate at the service operating point, and the service operating point of the turbo compressor 212 can be more reliably restrained from entering the surging region.

Besides, in the present embodiment, the corrections are carried out in accordance with the start condition and the end condition, which have been set such that the operating point of the turbo compressor 212 does not enter the surging region, and that the air flow rate and the air pressure that are required for electric power generation of the fuel cell 100 do not drop below their lower limits. Therefore, the air flow rate and the air pressure that are required for electric power generation of the fuel cell 100 can be guaranteed, while restraining the service operating point from entering the surging region.

C. Third Embodiment

Figure 10:
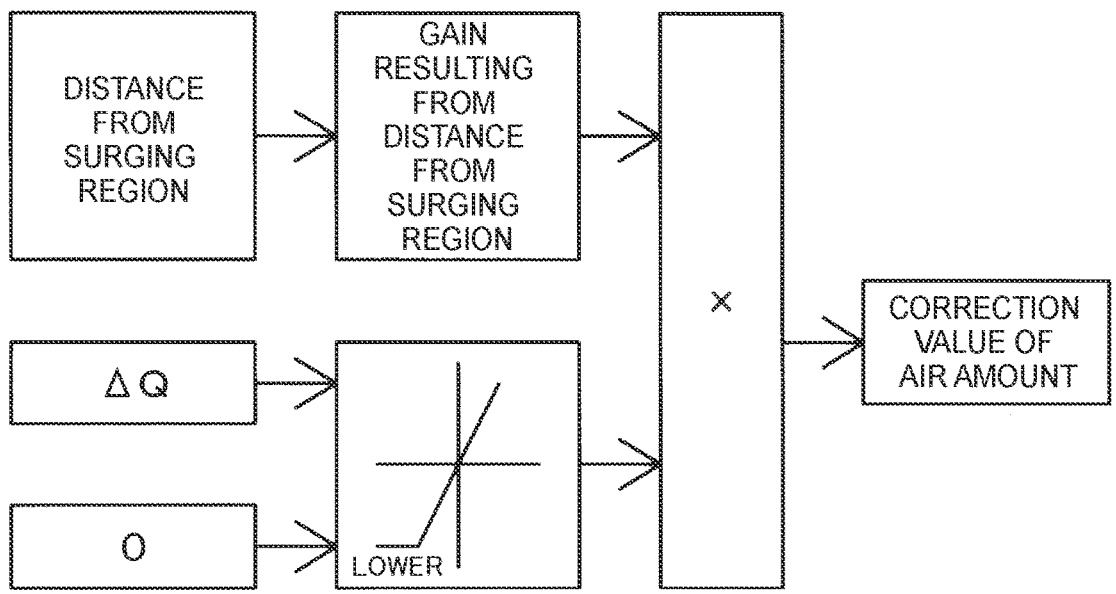
FIG. 10 is an image view of a method of calculating correction amounts of valve opening degrees in the third embodiment.

FIG. 10 is an image view of a method of correcting the opening degrees of the valves in the third embodiment. In the third embodiment, the configuration of the fuel cell system 10 is the same as in the first embodiment (FIG. 1). The same flowchart as in the first embodiment (FIG. 3) is used to show processing contents of opening degree control of the pressure adjusting valve 221 and the bypass valve 231. The third embodiment is different from the first embodiment (FIG. 4) in that the control unit 300 reduces the amount of increase in each of the opening degrees of the pressure adjusting valve 221 and the bypass valve 231 by multiplying the calculated command values of the air flow rate and the air pressure by correction gains respectively, as the distance between the service operating point and the surging region increases, in correcting the opening degrees. Incidentally, the present embodiment is also different from the first embodiment in that the corrections are carried out when the distance from the surging region becomes equal to or shorter than 30%.

A method of setting the command value of the air flow rate in the present embodiment will be described with reference to FIG. 10. The control unit 300 calculates a correction amount of the air flow rate such that the difference between the actually measured value of the air flow rate calculated in step S140 of FIG. 3 and the command value thereof becomes small, as is the case with the first embodiment. In this case, the control unit 300 calculates an amount of a correction gain about the air flow rate corresponding to the distance from the surging region, with reference to a correction gain map (FIG. 11) that will be described later, and multiplies the correction amount of the air flow rate by the correction gain. After that, the control unit 300 summates the correction amount of the air flow rate multiplied by the correction gain and the command value of the air flow rate, as is the case with the first embodiment (FIG. 4).

Figure 11:
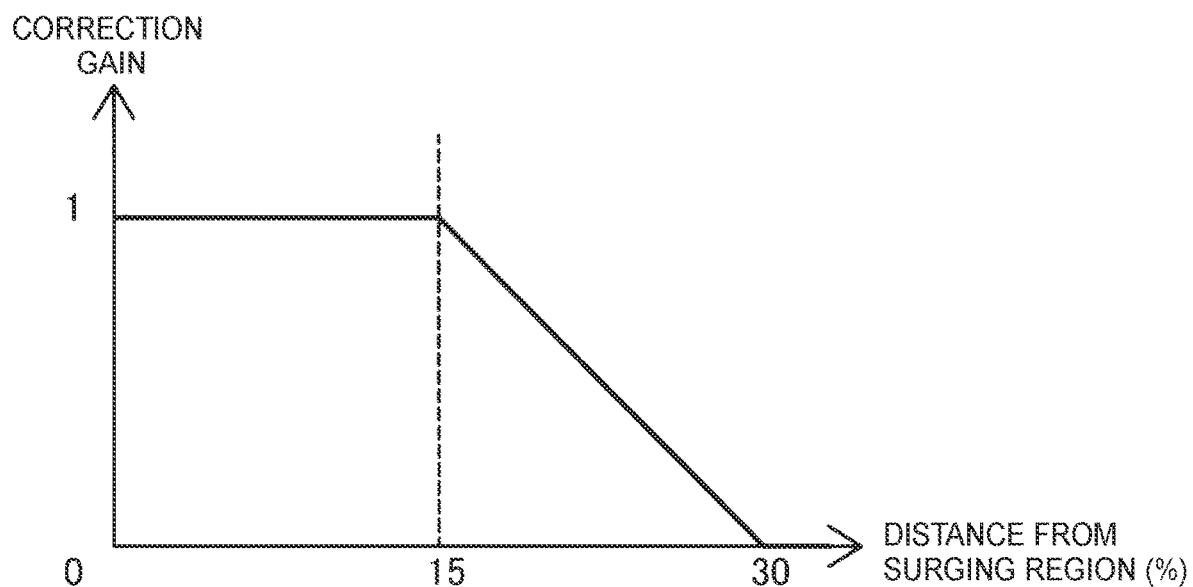
FIG. 11 is a correction gain map corresponding to a distance from a surging region.

FIG. 11 is an exemplary correction gain map corresponding to the distance from the surging region. The axis of abscissa represents the distance from the surging region. The axis of ordinate represents the amount of the correction gain. This correction gain map is recorded with the amount of the correction gain associated with the distance from the surging region. The correction gain map is obtained by finding an appropriate amount of the correction gain corresponding to the distance from the surging region, through a test conducted in advance or the like. In the correction gain map in the present embodiment, when the distance from the surging region is equal to or shorter than 15%, the correction gain is equal to 1. When the distance from the surging region exceeds 30%, the correction gain is equal to 0. When the distance from the surging region is between 15% and 30%, the correction gain linearly changes from 1 to 0. Incidentally, the control unit 300 may calculate the amount of the correction gain based on a function determined in advance, instead of referring to the correction gain map.

The control unit 300 calculates a correction amount of the air pressure such that the difference between the actually measured value of the air pressure and the command value thereof becomes small, as is the case with the above-mentioned correction of the air flow rate. Besides, the control unit 300 calculates an amount of the correction gain about the air pressure corresponding to the distance from the surging region, with reference to the correction gain map, and multiplies the correction amount of the air pressure by the correction gain. After that, the control unit 300 summates the correction amount of the air pressure multiplied by the correction gain and the command value of the air pressure.

In the fuel cell system 10 according to the present embodiment described above, as the distance between the service operating point of the turbo compressor 212 and the surging region decreases, the correction amounts of the opening degree of the pressure adjusting valve 221 and the opening degree of the bypass valve 231 are gradually increased by the correction gains respectively. Therefore, each of the opening degrees of the pressure adjusting valve 221 and the bypass valve 231 is restrained from being rapidly changed across the threshold, and the occurrence of hunting, that is, the repetition of upward and downward fluctuations in the air flow rate and the air pressure at the service operating point with respect to the air flow rate and the air pressure at the required operating point can be suppressed.

Incidentally, although the present embodiment has been described as being combined with the first embodiment, it is also possible to combine the present embodiment with the second embodiment. In this case, the control unit 300 determines whether or not a correction should be carried out in accordance with the predetermined start condition and the predetermined end condition (FIG. 9), and calculates a correction amount through the use of a correction gain when the correction is carried out (FIGS. 10 and 11).

D. Fourth Embodiment

Figure 12:
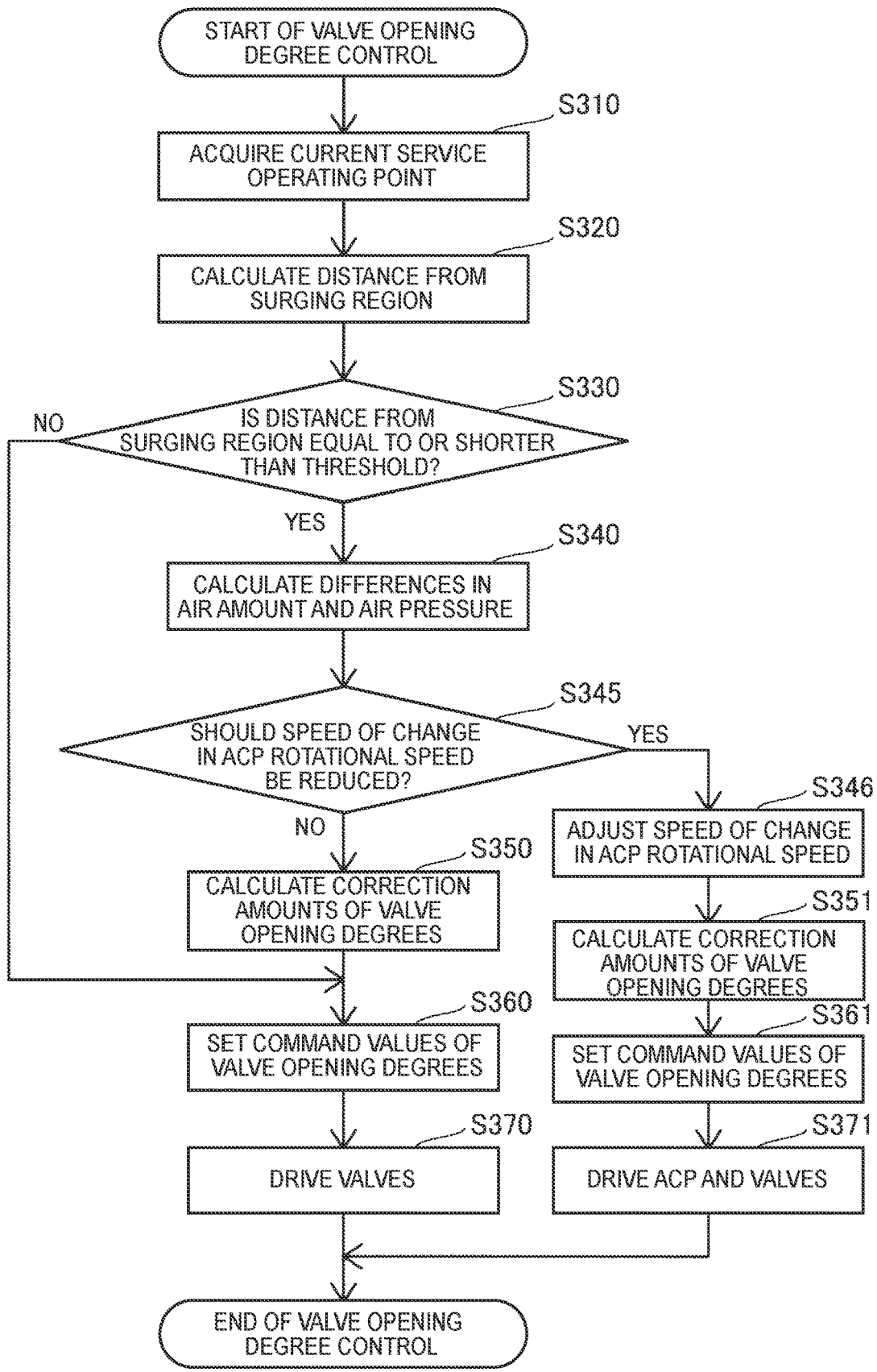
FIG. 12 is a flowchart showing processing contents of valve opening degree control in the fourth embodiment.

FIG. 12 is a flowchart showing processing contents of corrections of the opening degrees of the pressure adjusting valve 221 and the bypass valve 231 in the fourth embodiment. In the fourth embodiment, the configuration of the fuel cell system 10 is the same as in the first embodiment (FIG. 1). The fourth embodiment is different from the first embodiment (FIG. 3) in that the control unit 300 determines whether or not the amount of change in the rotational speed of the turbo compressor 212 per unit time (the speed of change in the rotational speed of the turbo compressor 212) should be reduced, in correcting the opening degree of the pressure adjusting valve 221 and the opening degree of the bypass valve 231.

The processing contents of the corrections of the opening degree of the pressure adjusting valve 221 and the opening degree of the bypass valve 231 in the present embodiment will be described through the use of FIG. 12. First of all, the control unit 300 acquires a service operating point at a current control timing (step S310), and calculates a distance between the service operating point and the surging region (step S320), as is the case with the first embodiment. If the distance from the surging region exceeds a threshold (NO in step S330), the control unit 300 sets a command value of the opening degree of the pressure adjusting valve 221 and a command value of the opening degree of the bypass valve 231, which correspond to a command value of the air flow rate and a command value of the air pressure at the current control timing respectively, such that the turbo compressor 212 operates at the required operating point (step S360), and drives the pressure adjusting valve 221 and the bypass valve 231 based on the set command values of the opening degrees respectively (step S370). After step S370, the control unit 300 carries out this process at a subsequent control timing again from step S310. The control unit 300 repeats this process while transferring the operating point of the turbo compressor 212 from the first operating point to the second operating point.

On the other hand, if the distance from the surging region is equal to or shorter than the threshold (YES in step S330), the control unit 300 calculates a difference between an actually measured value of the air flow rate and the command value thereof at the current control timing, and calculates a difference between an actually measured value of the air pressure and the command value thereof at the current control timing (step S340). Subsequently, the control unit 300 determines whether or not the speed of change in the rotational speed of the turbo compressor 212 should be reduced (step S345). In the present embodiment, when the difference between the flow rate at the service operating point of the turbo compressor 212 and the flow rate in the surging region is equal to or lower than 5% of the flow rate at the service operating point, the control unit 300 determines that the speed of change in the rotational speed of the turbo compressor 212 should be reduced. If it is determined that the speed of change in the rotational speed of the turbo compressor 212 should not be reduced (NO in step S345), the control unit 300 calculates a correction amount of the opening degree of the pressure adjusting valve 221 and a correction amount of the opening degree of the bypass valve 231 (step S350), sets a command value of the opening degree of the pressure adjusting valve 221 and a command value of the opening degree of the bypass valve 231 (step S360), and drives the pressure adjusting valve 221 and the bypass valve 231 based on the set command values (step S370), as is the case with the first embodiment. After step S370, the control unit 300 performs this process at a subsequent control timing again from step S310. The control unit 300 repeats this process while transferring the operating point of the turbo compressor 212 from the first operating point to the second operating point. Incidentally, in the present embodiment, when the difference between the flow rate at the service operating point of the turbo compressor 212 and the flow rate in the surging region is equal to or lower than 5% of the flow rate at the service operating point, the control unit 300 determines that the speed of change in the rotational speed of the turbo compressor 212 should be reduced. However, the control unit 300 may determine that the speed of change in the rotational speed of the turbo compressor 212 should be reduced, when the difference between the actually measured value of the air flow rate and the command value thereof is equal to or lower than a predetermined flow rate, or when the difference between the actually measured value of the air pressure and the command value thereof is equal to or higher than a predetermined pressure. The control unit 300 may calculate a difference between a command value of the rotational speed of the turbo compressor 212 and an actually measured value thereof at the current control timing, and may determine that the speed of change in the rotational speed of the turbo compressor 212 should be reduced, when the difference between the actually measured value of the rotational speed of the turbo compressor 212 and the command value thereof is equal to or lower than a predetermined rotational speed.

On the other hand, if it is determined that the speed of change in the rotational speed of the turbo compressor 212 should be reduced (YES in step S345), the control unit 300 first sets a command value of the rotational speed of the turbo compressor 212 such that the speed of change in the rotational speed of the turbo compressor 212 becomes low (step S346). The command value set by the control unit 300 in this case may be a command value of a torque for driving the turbo compressor 212, or a command value of a current of a motor for driving the turbo compressor 212, instead of the command value of the rotational speed of the turbo compressor 212. Subsequently, the control unit 300 calculates a correction amount of the opening degree of the pressure adjusting valve 221 and a correction amount of the opening degree of the bypass valve 231 (step S351), and sets a command value of the opening degree of the pressure adjusting valve 221 and a command value of the opening degree of the bypass valve 231 (step S361). After that, the control unit 300 drives the pressure adjusting valve 221, the bypass valve 231, and the turbo compressor 212 based on the set command values (step S371). After step S371, the control unit 300 performs this process at a subsequent control timing again from step S310. The control unit 300 repeats this process while transferring the operating point of the turbo compressor 212 from the first operating point to the second operating point.

In the fuel cell system 10 according to the present embodiment described above, the control unit 300 corrects the opening degree of the pressure adjusting valve 221 and the opening degree of the bypass valve 231, and reduces the amount of change in the rotational speed of the turbo compressor 212 per unit time. Therefore, the command values of the air flow rate and the air pressure, which have been set to ensure operation at the required operating point, and the air flow rate and the air pressure at the service operating point are restrained from deviating from each other respectively as a result of rapid changes in the rotational speed of the turbo compressor 212, and the service operating point of the turbo compressor 212 can be more reliably restrained from entering the surging region.

Incidentally, although the present embodiment has been described as being combined with the first embodiment, it is also possible to combine the present embodiment with the second embodiment. In this case, the control unit 300 determines whether or not the opening degree of the pressure adjusting valve 221 and the opening degree of the bypass valve 231 should be corrected in accordance with the predetermined start condition and the predetermined end condition (FIG. 9), determines whether or not the speed of change in the rotational speed of the turbo compressor 212 should be reduced, and sets a command value of the rotational speed of the turbo compressor 212 such that the speed of change in the rotational speed of the turbo compressor 212 becomes low, in correcting the opening degree of the pressure adjusting valve 221 and the opening degree of the bypass valve 231 (FIG. 12). By further combining the present embodiment with the third embodiment, the correction amounts may be calculated through the use of the correction gains in the case where the opening degree of the pressure adjusting valve 221 and the opening degree of the bypass valve 231 are corrected (FIGS. 10 and 11).

E. Fifth Embodiment

Figure 13:
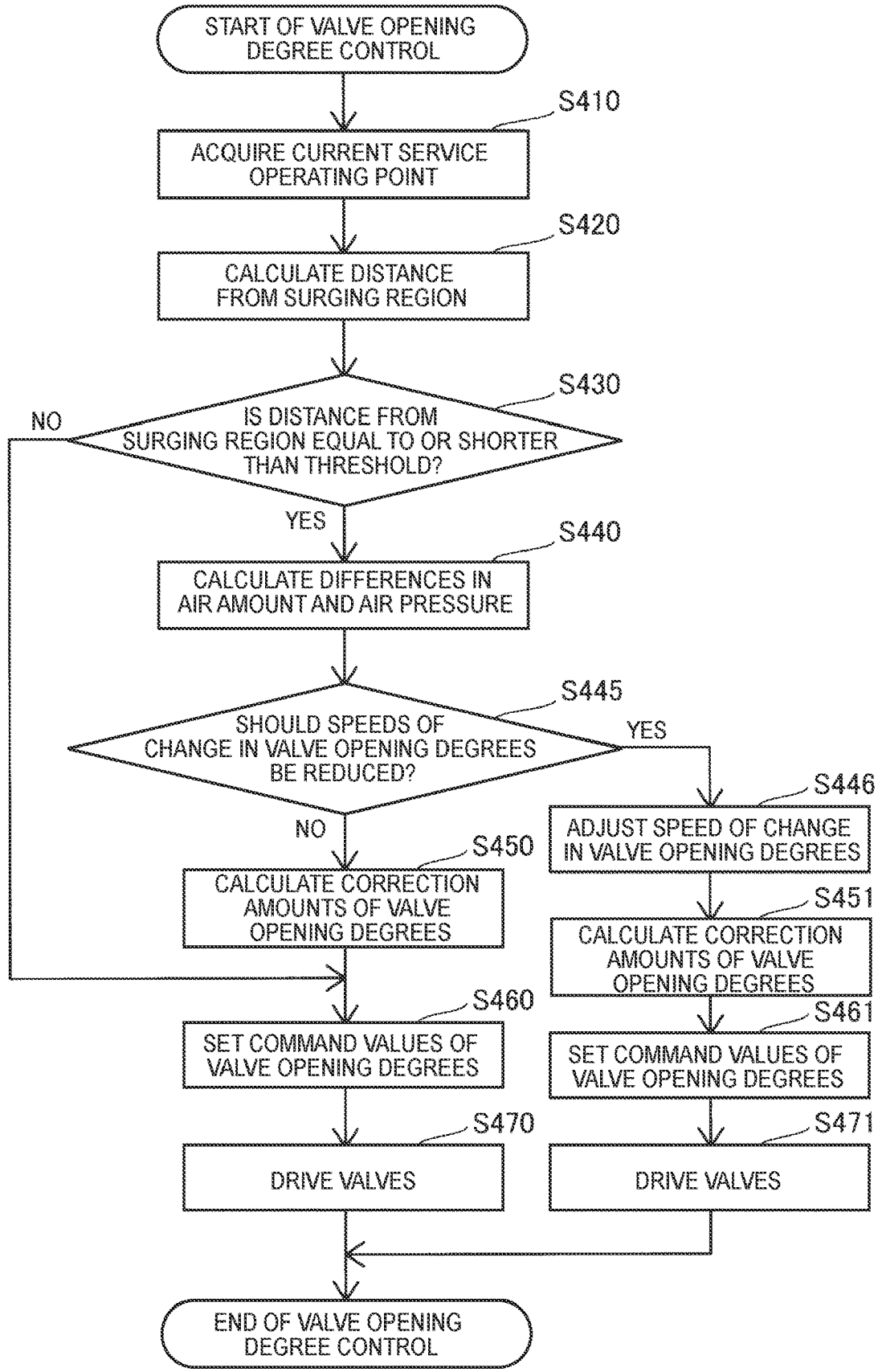
FIG. 13 is a flowchart showing processing contents of valve opening degree control in the fifth embodiment.

FIG. 13 is a flowchart showing processing contents of corrections of the opening degrees of the pressure adjusting valve 221 and the bypass valve 231 in the fifth embodiment. In the fifth embodiment, the configuration of the fuel cell system 10 is the same as in the first embodiment (FIG. 1). The fifth embodiment is different from the first embodiment (FIG. 3) in that the control unit 300 determines whether or not the amount of change in at least one of the opening degree of the pressure adjusting valve 221 and the opening degree of the bypass valve 231 per unit time (the speed of change in each of the opening degree of the pressure adjusting valve 221 and the opening degree of the bypass valve 231) should be reduced, in correcting the opening degree of the pressure adjusting valve 221 and the opening degree of the bypass valve 231.

The processing contents of the corrections of the opening degree of the pressure adjusting valve 221 and the opening degree of the bypass valve 231 in the present embodiment will be described through the use of FIG. 13. First of all, the control unit 300 acquires a service operating point at a current control timing (step S410), and calculates a distance between the service operating point and the surging region (step S420), as is the case with the first embodiment. If the distance from the surging region exceeds a threshold (NO in step S430), the control unit 300 sets a command value of the opening degree of the pressure adjusting valve 221 and a command value of the opening degree of the bypass valve 231, which correspond to a command value of the air flow rate and a command value of the air pressure at the current control timing respectively, such that the turbo compressor 212 operates at the required operating point (step S460), and drives the pressure adjusting valve 221 and the bypass valve 231 based on the set command values of the opening degrees respectively (step S470).

On the other hand, if the distance from the surging region is equal to or shorter than the threshold (YES in step S430), the control unit 300 calculates a difference between an actually measured value of the air flow rate and the command value thereof at the current control timing, and a difference between an actually measured value of the air pressure and the command value thereof at the current control timing (step S440). Subsequently, the control unit 300 determines whether or not the speeds of change in the opening degree of the pressure adjusting valve 221 and the opening degree of the bypass valve 231 should be reduced (step S445). In the present embodiment, when the difference between the flow rate at the service operating point of the turbo compressor 212 and the flow rate in the surging region is equal to or lower than 5% of the flow rate at the service operating point, the control unit 300 determines that the speeds of change in the opening degree of the pressure adjusting valve 221 and the opening degree of the bypass valve 231 should be reduced. If the speeds of change in the opening degree of the pressure adjusting valve 221 and the opening degree of the bypass valve 231 should not be reduced (NO in step S445), the control unit 300 calculates a correction amount of the opening degree of the pressure adjusting valve 221 and a correction amount of the opening degree of the bypass valve 231 (step S450), sets a command value of the opening degree of the pressure adjusting valve 221 and a command value of the opening degree of the bypass valve 231 (step S460), and drives the pressure adjusting valve 221 and the bypass valve 231 based on the set command values (step S470), as is the case with the first embodiment. After step S470, the control unit 300 performs this process at a subsequent control timing again from step S410. The control unit 300 repeats this process while transferring the operating point of the turbo compressor 212 from the first operating point to the second operating point.

On the other hand, if it is determined that the speeds of change in the opening degree of the pressure adjusting valve 221 and the opening degree of the bypass valve 231 should be reduced (YES in step S445), the control unit 300 first sets a command value of the opening degree of the pressure adjusting valve 221 and a command value of the opening degree of the bypass valve 231 such that the speeds of change in the opening degree of the pressure adjusting valve 221 and the opening degree of the bypass valve 231 should be reduced (step S446). Each of the command values set by the control unit 300 in this case may be a command value of a torque for driving each of the valves, or a command value of a current of a motor for driving each of the valves, instead of the command value of the opening degree of each of the valves. Subsequently, the control unit 300 calculates a correction amount of the opening degree of the pressure adjusting valve 221, and a correction amount of the opening degree of the bypass valve 231 (step S451), and sets a command value of the opening degree of the pressure adjusting valve 221 and a command value of the opening degree of the bypass valve 231 (step S461). After that, the control unit 300 drives the pressure adjusting valve 221 and the bypass valve 231 based on the set command values (step S471). After step S471, the control unit 300 performs this process at a subsequent control timing again from step S410. The control unit 300 repeats this process while transferring the operating point of the turbo compressor 212 from the first operating point to the second operating point.

In the fuel cell system 10 according to the present embodiment described above, the control unit 300 corrects the opening degree of the pressure adjusting valve 221 and the opening degree of the bypass valve 231, and reduces the amounts of change in the opening degree of the pressure adjusting valve 221 and the opening degree of the bypass valve 231 per unit time. Therefore, the command values of the air flow rate and the air pressure, which have been set to ensure operation at the required operating point, and the air flow rate and the air pressure at the service operating point are restrained from deviating from each other respectively as a result of rapid changes in the rotational speed of the turbo compressor 212, and the service operating point of the turbo compressor 212 can be more reliably restrained from entering the surging region.

Incidentally, although the present embodiment has been described as being combined with the first embodiment, it is also possible to combine the present embodiment with the second embodiment. In this case, the control unit 300 determines whether or not the opening degree of the pressure adjusting valve 221 and the opening degree of the bypass valve 231 should be corrected in accordance with the predetermined start condition and the predetermined end condition (FIG. 9), determines whether or not the speeds of change in the opening degree of the pressure adjusting valve 221 and the opening degree of the bypass valve 231 should be reduced, and sets a command value of the opening degree of the pressure adjusting valve 221 and a command value of the opening degree of the bypass valve 231 such that the speeds of change in the opening degree of the pressure adjusting valve 221 and the opening degree of the bypass valve 231 become low, in correcting the opening degree of the pressure adjusting valve 221 and the opening degree of the bypass valve 231 (FIG. 13). Besides, by further combining the present embodiment with the third embodiment, the correction amounts may be calculated through the use of the correction gains respectively in the case where the opening degree of the pressure adjusting valve 221 and the opening degree of the bypass valve 231 are corrected (FIGS.

10 and 11). Furthermore, by further combining the present embodiment with the fourth embodiment, it may be determined whether or not the speed of change in the rotational speed of the turbo compressor 212 should be reduced, and the speeds of change in the opening degree of the pressure adjusting valve 221 and the opening degree of the bypass valve 231 may be reduced, and the speed of change in the rotational speed of the turbo compressor 212 may be reduced, in correcting the opening degree of the pressure adjusting valve 221 and the opening degree of the bypass valve 231 (FIG. 12).

F. First Additional Embodiment

In the fuel cell system 10 according to each of the above-mentioned embodiments, the first flow rate sensor 211 is provided upstream of the turbo compressor 212 in the air supply flow passage 210, and the second flow rate sensor 215 is provided between the inlet valve 214 and the fuel cell 100 in the air supply flow passage 210. In contrast, the first flow rate sensor 211 may be provided downstream of the turbo compressor 212 in the air supply flow passage 210, and upstream of that portion of the air supply flow passage 210 which is connected to the bypass flow passage 230, and the second flow rate sensor 215 may be provided in the bypass flow passage 230. Any form is acceptable as long as the flow rate of air supplied to the fuel cell 100 and the flow rate of air flowing through the bypass flow passage 230 can be acquired through the use of the air flow rate acquired by the first flow rate sensor 211 and the air flow rate acquired by the second flow rate sensor 215.

G. Second Additional Embodiment

The fuel cell system 10 according to each of the above-mentioned embodiments is equipped with the second flow rate sensor 215, and calculates the correction amounts of the opening degree of the pressure adjusting valve 221 and the opening degree of the bypass valve 231 through the use of the air flow rate acquired by the second flow rate sensor 215. In contrast, the fuel cell system 10 may not be equipped with the second flow rate sensor 215. In this case, flow passage resistances of the air supply flow passage 210, the air discharge flow passage 220, and the bypass flow passage 230 are acquired through a test conducted in advance or the like, and the flow rate of air supplied to the fuel cell 100 is estimated through calculation, through the use of the air flow rate acquired by the first flow rate sensor 211 and the flow passage resistances of the respective flow passages.

H. Third Additional Embodiment

In the fuel cell system 10 according to each of the above-mentioned embodiments, the control unit 300 uses the difference between the air flow rate at the service operating point and the air flow rate at the operating point on the surging limit line with the same pressure ratio as at the service operating point, as the distance between the service operating point and the surging region. In contrast, the control unit 300 may use the difference between the pressure ratio at the operating point on the surging limit line with the same air flow rate as at the service operating point and the pressure ratio at the service operating point, the distance between the service operating point and the operating point on the surging limit line closest to the service operating point, or the distance on the iso rotational speed line, as the distance between the service operating point and the surging region. Besides, the service operating point may not be acquired through the use of the actually measured values acquired by the sensors at the current control timing, but may be estimated through the use of the command values set by the control unit 300 at the last control timing.

I. Fourth Additional Embodiment

In the fuel cell system 10 according to each of the above-mentioned embodiments, the control unit 300 corrects both the opening degree of the pressure adjusting valve 221 and the opening degree of the bypass valve 231. In contrast, the control unit 300 may correct only one of the opening degree of the pressure adjusting valve 221 and the opening degree of the bypass valve 231.

J. Fifth Additional Embodiment

In the fuel cell system 10 according to each of the above-mentioned embodiments, the control unit 300 calculates the difference between the actually measured value of the air flow rate and the command value thereof, calculates the difference between the actually measured value of the air pressure and the command value thereof, and calculates the correction amount of the opening degree of the pressure adjusting valve 221 and the correction amount of the opening degree of the bypass valve 231 through the use of the calculated differences (steps S140 and S150 in FIG. 3). In contrast, the control unit 300 may use the difference between the actually measured value of the rotational speed of the turbo compressor and the command value thereof, in calculating the correction amount of the opening degree of the pressure adjusting valve 221 and the correction amount of the opening degree of the bypass valve 231.

K. Sixth Additional Embodiment

In the fuel cell system 10 according to each of the above-mentioned embodiments, the bypass flow passage 230 establishes communication between the air supply flow passage 210 between the turbo compressor 212 and the inlet valve 214, and the air discharge flow passage 220 downstream of the pressure adjusting valve 221. In contrast, the bypass flow passage 230 may communicate with the atmosphere without the intermediary of the air discharge flow passage 220.

L. Seventh Additional Embodiment

In the third embodiment, the control unit 300 reduces the amounts of increase in the opening degree of the pressure adjusting valve 221 and the opening degree of the bypass valve 231 by multiplying the calculated command values of the air flow rate and the air pressure by the correction gains respectively, as the distance between the service operating point and the surging region increases, in correcting the opening degrees. In contrast, the control unit 300 may reduce the amounts of increase in the opening degree of the pressure adjusting valve 221 and the opening degree of the bypass valve 231 by multiplying the calculated command values of the air flow rate and the air pressure by the correction gains respectively, as the difference between the flow rate of air discharged from the turbo compressor 212 at the service operating point and the flow rate of air discharged from the turbo compressor 212 at the required operating point decreases, in correcting the opening degrees. In this case, the occurrence of hunting, that is, the repetition of upward and downward fluctuations in the air flow rate and the air pressure with respect to the command values as a result of rapid changes in the opening degree of the pressure adjusting valve 221 and the opening degree of the bypass valve 231 can be suppressed.

M. Eighth Additional Embodiment

Figure 14:
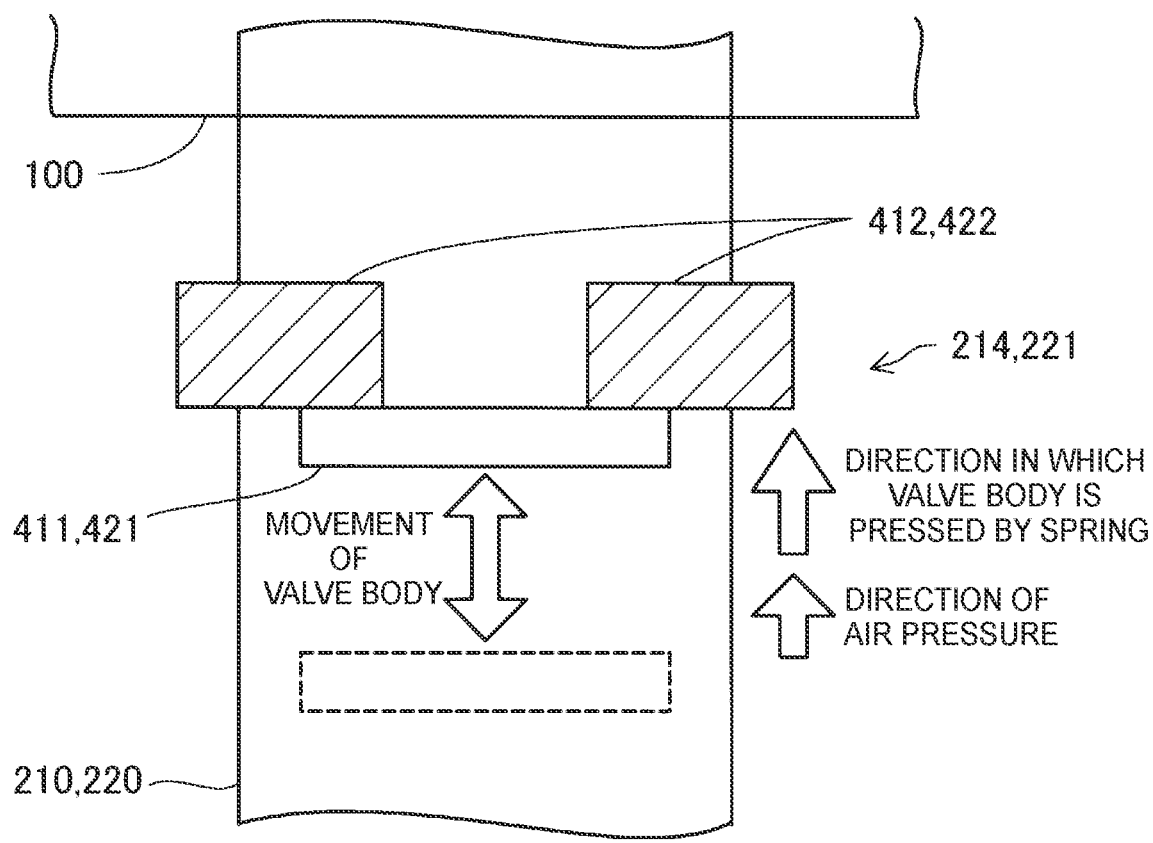
FIG. 14 is an illustrative view showing an inlet valve and a pressure adjusting valve according to another aspect.

FIG. 14 is an illustrative view showing the inlet valve 214 and the pressure adjusting valve 221 according to another aspect. FIG. 14 represents a positional relationship between an inlet valve body 411 of the inlet valve 214 and an inlet valve box 412 thereof. A positional relationship between a pressure adjusting valve body 421 of the pressure adjusting valve 221 and a pressure adjusting valve box 422 thereof is also the same as the positional relationship between the inlet valve body 411 of the inlet valve 214 and the inlet valve box 412 thereof. Therefore, the signs for the inlet valve 214 and the signs for the pressure adjusting valve 221 are shown side by side in FIG. 14.

The inlet valve 214 is equipped with the inlet valve body 411 and the inlet valve box 412. The inlet valve box 412 is arranged closer to the fuel cell 100 side than the inlet valve body 411. A force is applied to the inlet valve body 411 such that the inlet valve body 411 is pressed against the inlet valve box 412. In the present embodiment, the force with which the inlet valve body 411 is pressed against the inlet valve box 412 is imparted by a spring. In order to open the inlet valve 214, the inlet valve body 411 is driven by the motor oppositely to the direction in which the inlet valve body 411 is pressed by the spring. When the driving force applied by the motor is removed, the inlet valve body 411 is pressed against the inlet valve box 412 by the spring, and the inlet valve 214 is closed.

After electric power generation of the fuel cell 100 is stopped, the inlet valve 214 and the pressure adjusting valve 221 are closed, and the interior of the fuel cell 100 is sealed, with a view to restraining a catalyst of the fuel cell 100 from deteriorating. At this time, the air pressure in the fuel cell 100 is made equal to a pressure lower than the atmospheric pressure (a negative pressure), and the pressure in the air supply flow passage 210 and the pressure in the air discharge flow passage 220 are made equal to the atmospheric pressure. Therefore, a differential pressure is created between the fuel cell 100 side of the inlet valve body 411 and the air supply flow passage 210 side thereof, and a differential pressure is created between the fuel cell 100 side of the pressure adjusting valve body 421 and the air discharge flow passage 220 side thereof. The direction in which the inlet valve body 411 is pressed against the inlet valve box 412 by the spring is the same as the direction of the differential pressure applied to the inlet valve body 411, and the direction in which the pressure adjusting valve body 421 is pressed against the pressure adjusting valve box 422 by the spring is the same as the direction of the differential pressure applied to the pressure adjusting valve body 421. In this case, the sealing performance of each of the inlet valve 214 and the pressure adjusting valve 221 is improved in comparison with the case where it is closed only through the force of the spring. Incidentally, only one of the inlet valve 214 and the pressure adjusting valve 221 may be configured in the above-mentioned form.

In the fuel cell system 10, electric power generation may be stopped by stopping supplying air to the fuel cell 100, while driving the turbo compressor 212 to consume electric power. In this case, the air discharged by the turbo compressor 212 is caused to flow through the bypass flow passage 230 and discharged from the air discharge flow passage 220, by closing the inlet valve 214 and opening the bypass valve 231. At this time, a differential pressure is created between the fuel cell 100 side of the inlet valve body 411 and the air supply flow passage 210 side thereof. The direction in which the inlet valve body 411 is pressed against the inlet valve box 412 by the spring is the same as the direction of the differential pressure applied to the inlet valve body 411. In this case, the sealing performance of the inlet valve 214 is improved in comparison with the case where it is closed only through the force of the spring.

The disclosure is not limited to the above-mentioned embodiments, but can be realized in various configurations within such a range as not to depart from the gist thereof. For example, the technical features in the embodiments corresponding to the technical features in the respective aspects described in the section of the summary of the disclosure can be appropriately replaced or combined with one another, in order to solve one, some, or all of the above-mentioned problems, or achieve one, some, or all of the above-mentioned effects. Besides, the technical features can be appropriately deleted unless they are described as being indispensable in the present specification.

What is claimed is:

1. A fuel cell system comprising:
   a fuel cell;
   an air supply flow passage through which air is applied to the fuel cell;
   an air discharge flow passage to which the air is discharged from the fuel cell;
   a bypass flow passage through which the air in the air supply flow passage is discharged without intermediary of the fuel cell;
   a turbo compressor that supplies the air to the air supply flow passage, the turbo compressor being provided upstream of a portion of the air supply flow passage that is connected to the bypass flow passage;
   a pressure adjusting valve that is provided in the air discharge flow passage;
   a bypass valve that is provided in the bypass flow passage; and
   a control unit that controls driving of the turbo compressor, an opening degree of the pressure adjusting valve, and an opening degree of the bypass valve in accordance with a required operating point including an air flow rate and an air pressure that are required for electric power generation of the fuel cell, wherein
   the control unit is configured to
      acquire a service operating point including the air flow rate and the air pressure in the air supply flow passage while transferring an operating point of the turbo compressor from a first operating point to a second operating point, the first operating point and the second operating point being outside a surging region as an operating point range where surging occurs in the turbo compressor,
      repeat a process of calculating a distance between the service operating point and the surging region,
      set the opening degrees of the pressure adjusting valve and the bypass valve such that the turbo compressor operates at the required operating point, when the distance exceeds a threshold, and
      correct at least one of the opening degrees of the pressure adjusting valve and the bypass valve such that the at least one of the opening degrees becomes larger than an opening degree set such that the turbo compressor operates at the required operating point, when the distance is equal to or shorter than the threshold.

2. The fuel cell system according to claim 1, wherein the control unit is configured to correct the opening degree of the bypass valve when a difference between the air flow rate at the service operating point and the air flow rate set to ensure operation at the required operating point is equal to or higher than a flow rate determined in advance, in a case where the distance is equal to or shorter than the threshold.

3. The fuel cell system according to claim 1, wherein the control unit is configured to reduce an amount of increase in the at least one of the opening degrees of the pressure adjusting valve and the bypass valve as the distance increases, in a case where the distance is equal to or shorter than the threshold.

4. The fuel cell system according to claim 1, wherein the control unit is configured to make an amount of change in rotational speed of the turbo compressor per unit time smaller than when the at least one of the opening degrees of the pressure adjusting valve and the bypass valve is not corrected, in correcting the at least one of the opening degrees of the pressure adjusting valve and the bypass valve in a case where the distance is equal to or shorter than the threshold.

5. The fuel cell system according to claim 1, wherein the control unit is configured to make an amount of change in the at least one of the opening degrees of the pressure adjusting valve and the bypass valve per unit time smaller than when the at least one of the opening degrees of the pressure adjusting valve and the bypass valve is not corrected, in correcting the at least one of the opening degrees of the pressure adjusting valve and the bypass valve in a case where the distance is equal to or shorter than the threshold.

6. The fuel cell system according to claim 1, wherein the distance is a difference between the air flow rate at the service operating point and the air flow rate at the operating point on a surging limit line with a same pressure ratio as at the service operating point,
the threshold is a predetermined ratio of the air flow rate at the operating point on the surging limit line with the same pressure ratio as at the service operating point, and
the surging limit line is a borderline between the surging region and a normal region where surging does not occur.

7. A method of controlling a fuel cell system that is equipped with a fuel cell, comprising:
acquiring a service operating point including an air flow rate and an air pressure in an air supply flow passage in which a turbo compressor is provided, and repeating a process of calculating a distance between the service operating point and a surging region as an operating point range where surging occurs in the turbo compressor, while transferring an operating point of the turbo compressor, which supplies air to the fuel cell, from a first operating point to a second operating point, the first operating point and the second operating point being outside the surging region;
setting an opening degree of a pressure adjusting valve that is provided in an air discharge flow passage through which air is discharged from the fuel cell, and an opening degree of a bypass valve that is provided in a bypass flow passage through which the air in the air supply flow passage is discharged without intermediary of the fuel cell, such that the turbo compressor operates at a required operating point including the air flow rate and the air pressure that are required for electric power generation of the fuel cell, when the distance exceeds a threshold; and
correcting at least one of the opening degrees of the pressure adjusting valve and the bypass valve such that the at least one of the opening degrees becomes larger than an opening degree set such that the turbo compressor operates at the required operating point, when the distance is equal to or shorter than the threshold.

* * * * *